US012311674B2

(12) United States Patent
Tojo

(10) Patent No.: US 12,311,674 B2
(45) Date of Patent: May 27, 2025

(54) LIQUID EJECTING APPARATUS

(71) Applicant: SEIKO EPSON CORPORATION, Tokyo (JP)

(72) Inventor: Seiji Tojo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/449,404

(22) Filed: Aug. 14, 2023

(65) Prior Publication Data

US 2023/0382126 A1 Nov. 30, 2023

Related U.S. Application Data

(63) Continuation of application No. 17/339,277, filed on Jun. 4, 2021, now Pat. No. 11,801,685, which is a continuation of application No. 16/549,192, filed on Aug. 23, 2019, now Pat. No. 11,110,715.

(30) Foreign Application Priority Data

Aug. 27, 2018 (JP) ................................ 2018-158075

(51) Int. Cl.

*B41J 2/175* (2006.01)
*B41J 29/13* (2006.01)
*B41J 29/38* (2006.01)

(52) U.S. Cl.

CPC ....... *B41J 2/17596* (2013.01); *B41J 2/17523* (2013.01); *B41J 29/13* (2013.01); *B41J 29/38* (2013.01)

(58) Field of Classification Search

CPC .................................................... B41J 2/17596
See application file for complete search history.

(56) References Cited

U.S. PATENT DOCUMENTS

| | | | |
|---|---|---|---|
| 5,136,305 | A | 8/1992 | Ims |
| 5,933,172 | A | 8/1999 | Park et al. |
| 6,168,268 | B1 | 1/2001 | Sugiyama |
| 10,286,695 | B2 | 5/2019 | Moriyama et al. |
| 11,110,715 | B2 | 9/2021 | Tojo |

(Continued)

FOREIGN PATENT DOCUMENTS

| | | |
|---|---|---|
| CN | 1161279 | 10/1997 |
| CN | 113370659 | 8/2022 |

(Continued)

*Primary Examiner* — Shelby L Fidler
(74) *Attorney, Agent, or Firm* — WORKMAN NYDEGGER

(57) ABSTRACT

A liquid ejecting apparatus includes a liquid ejecting portion having a nozzle ejecting a liquid onto a medium, a liquid storage portion that stores the liquid, a supply flow path through which the liquid storage portion communicates with the liquid ejecting portion, an opening/closing mechanism having an opening/closing portion bringing the supply flow path into an open state or a closed state and an operation portion operating the opening/closing portion, a carriage mounted with the liquid ejecting portion and the opening/closing mechanism and configured to reciprocate in a main scanning direction, a contact portion that comes in contact with the opening/closing mechanism when the carriage moves while the supply flow path is in the closed state, and a detection portion that detects contact between the opening/closing mechanism and the contact portion.

15 Claims, 10 Drawing Sheets

(56) References Cited

U.S. PATENT DOCUMENTS

| | | | | |
|---|---|---|---|---|
| 2005/0041075 | A1* | 2/2005 | Fujioka | B41J 2/17523 347/85 |
| 2006/0044336 | A1 | 3/2006 | Asanuma | |
| 2008/0231674 | A1* | 9/2008 | Sugahara | B41J 2/175 347/85 |
| 2009/0028586 | A1 | 1/2009 | Yamashiro | |
| 2009/0244123 | A1* | 10/2009 | Niimi | B41J 2/2117 347/8 |
| 2010/0066774 | A1 | 3/2010 | Urabe | |
| 2010/0220127 | A1 | 9/2010 | Levy | |
| 2015/0202878 | A1* | 7/2015 | Mokhamad | B41J 2/17523 347/85 |
| 2016/0121619 | A1 | 5/2016 | Tomoguchi | |
| 2016/0250860 | A1 | 9/2016 | Turkenitz et al. | |
| 2017/0120617 | A1 | 5/2017 | Matsumura et al. | |
| 2017/0368833 | A1 | 12/2017 | Tomoguchi | |
| 2018/0126759 | A1 | 5/2018 | Moriyama et al. | |
| 2020/0062000 | A1 | 2/2020 | Tojo | |
| 2021/0291539 | A1 | 9/2021 | Tojo | |

FOREIGN PATENT DOCUMENTS

| | | |
|---|---|---|
| JP | 2001-063082 | 3/2001 |
| JP | 2006-068994 | 3/2006 |
| JP | 2008-068443 | 3/2008 |
| JP | 2008-307841 | 12/2008 |
| JP | 2011-194639 | 10/2011 |
| JP | 2014-188929 | 10/2014 |
| JP | 2015-024527 | 2/2015 |
| JP | 2015-027741 | 2/2015 |
| JP | 2015-134485 | 7/2015 |
| JP | 2016-087844 | 5/2016 |
| JP | 2016-538154 | 12/2016 |
| JP | 2017-077705 | 4/2017 |
| JP | 2017-081076 | 5/2017 |
| JP | 2017-081121 | 5/2017 |
| JP | 2018-012254 | 1/2018 |
| JP | 2018-079678 | 5/2018 |
| JP | 2023-080244 | 6/2023 |

* cited by examiner

LIQUID EJECTING APPARATUS

The present application is a continuation of U.S. patent application Ser. No. 17/339,277, filed Jun. 4, 2021, which is a continuation of U.S. patent application Ser. No. 16/549,192, filed Aug. 23, 2019 and issued as U.S. Pat. No. 11,110,715 on Sep. 7, 2021, which is based on, and claims priority from, JP Application Serial Number 2018-158075, filed Aug. 27, 2018, the disclosures of which are hereby incorporated by reference herein in their entirety.

BACKGROUND

1. Technical Field

The present disclosure relates to a liquid ejecting apparatus and a detection method of the liquid ejecting apparatus.

2. Related Art

In the related art, there is known a liquid ejecting apparatus that performs printing on a print medium by ejecting a liquid from a print head onto the print medium such as printing paper (for example, JP-A-2015-134485). The liquid ejecting apparatus described in JP-A-2015-134485 includes a liquid supply device supplying an ink stored in a tank (liquid storage portion) to the print head via a supply tube, and a flow path opening/closing device capable of manually opening/closing the supply tube (flow path). Even when the liquid ejecting apparatus is filled with the ink, the liquid ejecting apparatus can be transported in a state where the ink does not leak by manually closing the flow path using the flow path opening/closing device.

However, since the flow path was manually opened and closed, the liquid ejecting apparatus was transported with the flow path closed, and opening the flow path was forgotten after transporting the liquid ejecting apparatus, so that there was a possibility that a problem was occurred in which printing was resumed with the flow path closed.

SUMMARY

According to an aspect of the present application, there is provided a liquid ejecting apparatus including a liquid ejecting portion having a nozzle ejecting a liquid onto a medium, a liquid storage portion that stores the liquid, a supply flow path through which the liquid storage portion communicates with the liquid ejecting portion, an opening/closing mechanism having an opening/closing portion bringing the supply flow path into an open state or a closed state and an operation portion operating the opening/closing portion, a carriage mounted with the liquid ejecting portion and the opening/closing mechanism and configured to reciprocate in a main scanning direction, a contact portion that comes in contact with the opening/closing mechanism when the carriage moves while the supply flow path is in the closed state, and a detection portion that detects contact between the opening/closing mechanism and the contact portion.

In the liquid ejecting apparatus described above, the contact portion may be provided in a housing storing the liquid ejecting portion and the carriage.

In the liquid ejecting apparatus described above, the operation portion may contact the contact portion when the carriage moves while the supply flow path is in the closed state of the supply flow path.

In the liquid ejecting apparatus described above, the operation portion may include a lever configured to pivot between an open position where the supply flow path is in the open state and a closed position where the supply flow path is in the closed state, the opening/closing portion may include a pressing member that blocks the supply flow path when the lever is in the closed position, and opens the supply flow path when the lever is in the open position, and the lever may contact the contact portion when the carriage moves while the supply flow path is in the closed state.

In the liquid ejecting apparatus described above, the operation portion may be configured to move between the open position where the supply flow path is in the open state and the closed position where the supply flow path is in the closed state, and the contact portion may be disposed outside a movement region in which the operation portion positioned at the open position moves with a movement of the carriage, and may be disposed inside a movement region in which the operation portion positioned at the closed position moves with the movement of the carriage.

In the liquid ejecting apparatus described above, the opening/closing mechanism may include a displacement member that is displaced in interlocked with the operation portion, and the displacement member may contact the contact portion when the carriage moves while the supply flow path is in the closed state.

According to another aspect of the present application, there is provided a liquid ejecting apparatus including a liquid ejecting portion having a nozzle ejecting a liquid onto a medium, a liquid storage portion that stores the liquid, a supply flow path through which the liquid storage portion communicates with the liquid ejecting portion, an opening/closing mechanism having an opening/closing portion bringing the supply flow path into an open state or a closed state and an operation portion operating the opening/closing portion, a carriage mounted with the liquid ejecting portion, configured to reciprocate in a main scanning direction, and having a contact portion contacting the opening/closing mechanism when the supply flow path is in the closed state, and a detection portion that detects contact between the opening/closing mechanism and the contact portion.

In the liquid ejecting apparatus described above, the contact portion may contact the operation portion when the carriage moves while the supply flow path is in the closed state.

In the liquid ejecting apparatus described above, the opening/closing mechanism may include a displacement member that is displaced in interlocked with the operation portion, and the contact portion may contact the displacement member when the carriage moves while the supply flow path is in the closed state.

In the liquid ejecting apparatus described above, the operation portion may include a lever configured to pivot about a shaft portion between the open position where the supply flow path is in an open state and a closed position where the supply flow path is in the closed state, the opening/closing portion may include a pressing member that blocks the supply flow path when the lever is in the closed position and opens the supply flow path when the lever is in the open position, and the shaft portion, and the displacement member may be displaced in interlocked with a movement of the lever via the shaft portion.

In the liquid ejecting apparatus described above, the displacement member may be positioned in a movement region of the carriage when the supply flow path is in the closed state.

The liquid ejecting apparatus described above may further include a control portion that controls the movement of the carriage, and the control portion may move the carriage in a first direction in the main scanning direction, and may move the carriage in a second direction opposite to the first direction when the closed state of the supply flow path is detected.

The liquid ejecting apparatus described above may further include a notification portion that notifies that the supply flow path is in the closed state.

According to still another aspect of the present application, there is provided a detection method of a liquid ejecting apparatus including a liquid ejecting portion having a nozzle ejecting a liquid onto a medium, a liquid storage portion storing the liquid, a supply flow path through which the liquid storage portion communicates with the liquid ejecting portion, an opening/closing mechanism bringing the supply flow path into an open state or a closed state, and a carriage mounted with the liquid ejecting portion and configured to reciprocate in a main scanning direction, the method including detecting that the supply flow path is in the closed state by a movement of the carriage.

In the detection method of a liquid ejecting apparatus described above, it may be detected that the supply flow path is in the closed state when the movement of the carriage is inhibited.

In the detection method of a liquid ejecting apparatus described above, the liquid ejecting apparatus may further include a carriage motor moving the carriage, and it may be detected that the supply flow path is in the closed state by a driving load of the carriage motor.

In the detection method of a liquid ejecting apparatus described above, the carriage may be moved with power on, and the state of the supply flow path may be detected by the movement of the carriage.

DESCRIPTION OF EXEMPLARY EMBODIMENTS

Hereinafter, embodiments of the present disclosure will be described with reference to the drawings. Such an embodiment indicates one aspect of the present disclosure, does not limit the present disclosure, and can be any modified within the scope of the technical idea of the present disclosure.

Embodiment 1

Figure 1:
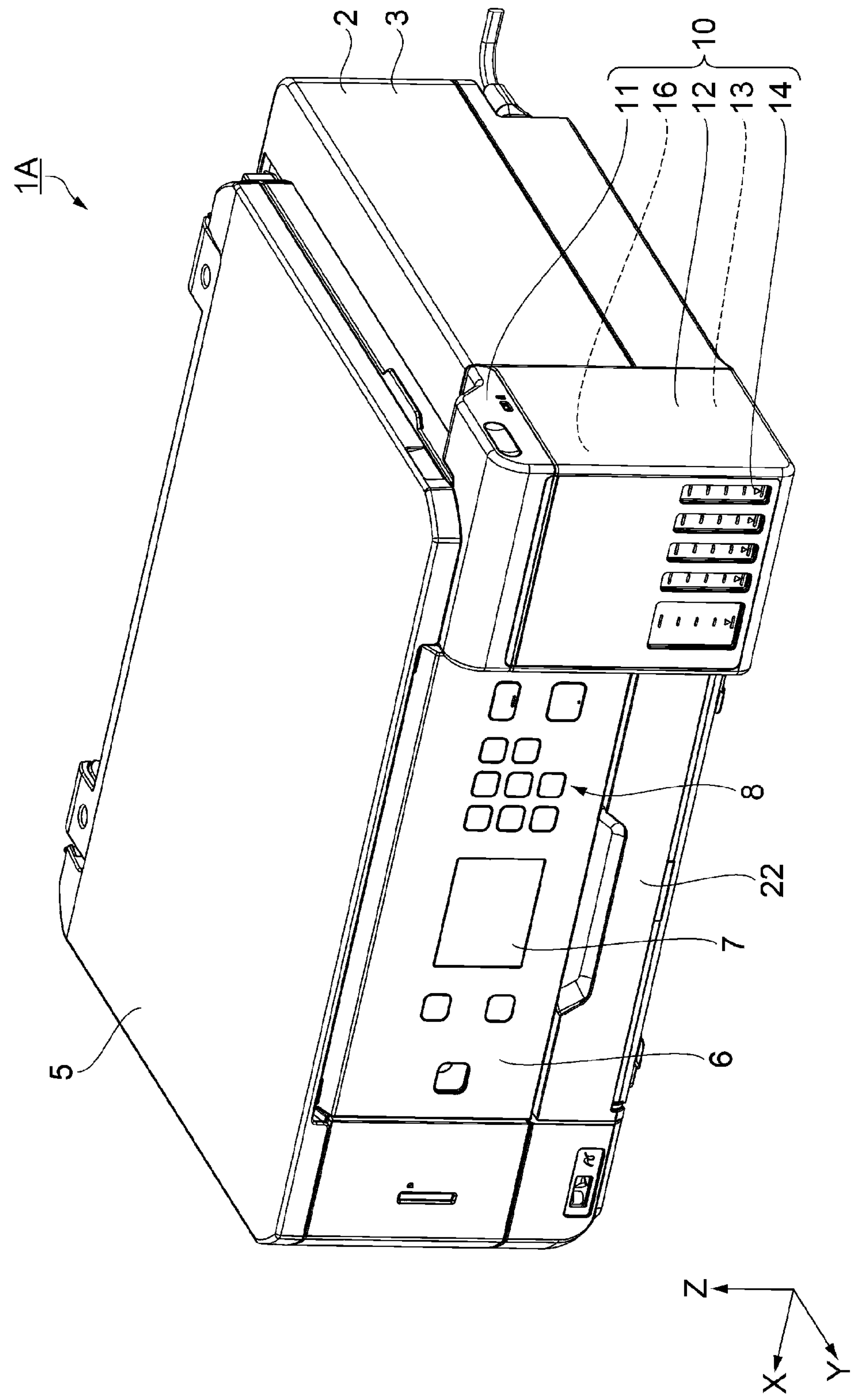
FIG. 1 is a perspective view of a liquid ejecting apparatus according to Embodiment 1.
Figure 2:
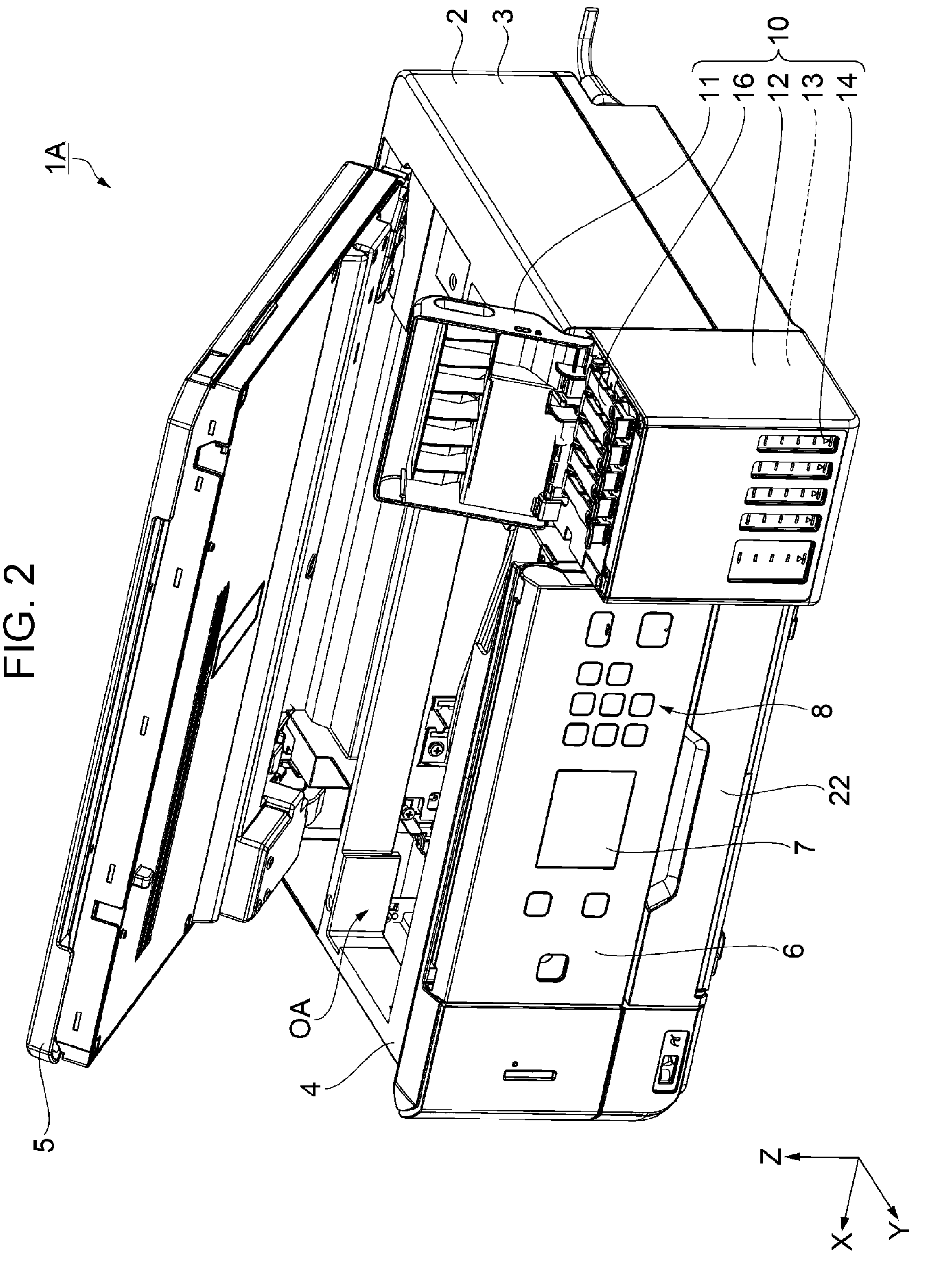
FIG. 2 is a perspective view of the liquid ejecting apparatus according to Embodiment 1.

FIGS. 1 and 2 are perspective views of a liquid ejecting apparatus 1A according to Embodiment 1. In FIG. 1, a state where a scanner 5 is closed with respect to an apparatus main body 2 is illustrated, and in FIG. 2, a state where the scanner 5 is opened with respect to the apparatus main body 2 is illustrated. First, a schematic configuration of the liquid ejecting apparatus 1A according to the present embodiment will be described with reference to FIGS. 1 and 2.

In the following description, a width direction of the liquid ejecting apparatus 1A is an X direction, a depth direction of the liquid ejecting apparatus 1A is a Y direction, and a height direction of the liquid ejecting apparatus 1A is a Z direction. The X direction and the Y direction are directions along a horizontal plane, and the Z direction is a direction orthogonal to the horizontal plane. Furthermore, a tip end side of an arrow indicating the direction is a (+) direction, and a base end side of the arrow indicating the direction is a (–) direction. The X direction is an example of a "main scanning direction".

About Liquid Ejecting Apparatus

The liquid ejecting apparatus 1A according to the present embodiment is, for example, an ink jet type printer that ejects and prints an ink, which is an example of "liquid", on a medium such as a sheet. In each of the following drawings, a scale of each layer or each member is made different from an actual scale in order to make each layer or each member have a recognizable size.

As illustrated in FIGS. 1 and 2, the liquid ejecting apparatus 1A is provided with the apparatus main body 2 and the scanner 5 disposed above the apparatus main body 2 and pivotable with respect to the apparatus main body 2. The apparatus main body 2 is provided with a liquid ejecting portion 50 (refer to FIG. 5), a carriage 30 (refer to FIG. 3), a transport mechanism 25 (refer to FIG. 5), a liquid storage unit 10, a supply flow path 40 (refer to FIG. 3), an opening/closing mechanism 60A (refer to FIG. 6), an operation panel 6, and a control portion 80 (refer to FIG. 5). The operation panel 6 is an example of a "notification portion".

The apparatus main body 2 is provided with a housing 3 which is an exterior frame of the apparatus main body 2. In the housing 3, the liquid ejecting portion 50, the carriage 30, the supply flow path 40, and the control portion 80 are disposed.

The operation panel 6 is disposed on a front side of the apparatus main body 2 (Y (+) direction side) in an apparatus depth direction. The operation panel 6 is provided with a display portion 7 such as a liquid crystal panel, and an operation button 8 provided with a plurality of input buttons, a power switch, and the like. The operation panel 6 is pivotably attached to the apparatus main body 2 on the front side in the apparatus depth direction (Y (+) direction side).

When the operation panel 6 is pivoted to the front side in the apparatus depth direction (Y (+) direction side) with respect to the apparatus main body 2, a medium discharge tray (not illustrated) stored in the apparatus main body 2 is exposed. The medium discharge tray is configured to be able to move rear and forth between a position stored in the apparatus main body 2 and a position pulled out from the apparatus main body 2 to the front side in the apparatus depth direction.

On a lower side in the apparatus height direction (Z (−) direction side) of the apparatus main body 2, a medium storage portion 22 capable of storing a medium is provided. The medium storage portion 22 can be inserted into and removed from the apparatus main body 2 on the front side in the apparatus depth direction (Y (+) direction side).

The scanner 5 is configured to be pivotable with respect to the apparatus main body 2 with a rear side in the apparatus depth direction (Y (−) direction side) as a pivot, and can be switched between a closed posture (refer to FIG. 1) and an open posture (refer to FIG. 2) with respect to the apparatus main body 2. The scanner 5 is positioned on an upper side of the carriage 30 described later in the apparatus height direction (Z (+) direction side). By switching the scanner 5 to the closed posture or the open posture, the upper surface inside the apparatus main body 2 can be exposed or covered. The liquid ejecting apparatus 1A may have a configuration not provided with the scanner 5. Instead of the scanner 5, an upper surface cover may be provided to cover the inside of the apparatus main body 2 from the upper surface.

The liquid storage unit 10 is provided on a right side in the apparatus width direction (X (−) direction side) and on the front side in the apparatus depth direction (Y (+) direction side) of the apparatus main body 2. The liquid storage unit 10 is provided with a plurality of liquid storage portions 13 storing the ink, a housing 12 covering the plurality of liquid storage portions 13, and a cover 11 pivotably attached to the housing 12.

The liquid storage unit 10 is disposed below the scanner 5 in a posture in which at least a portion is closed in the apparatus width direction (X direction). In the present embodiment, five liquid storage portions 13 are provided. In each liquid storage portion 13, any of a black ink, a magenta ink, a yellow ink, a cyan ink, and a photo black ink is stored in order from the X (+) direction side. In addition, the liquid storage portion 13 in which the black ink is stored is set to have a larger ink storage capacity than the other liquid storage portions 13. Furthermore, on a front side in the apparatus depth direction (Y (+) direction side) of the liquid storage portion 13, a display portion 14 capable of confirming the remaining amount of ink in each liquid storage portion 13 is provided.

The liquid storage portion 13 has an air communication portion (not illustrated) communicating with the inside of the liquid storage portion 13, and a supply port (not illustrated). The air communication portion is an inlet of the air to the liquid storage portion 13. When the ink in the liquid storage portion 13 is consumed and the amount of ink in the liquid storage portion 13 decreases, the pressure in the liquid storage portion 13 is lower than the atmospheric pressure. At this time, the air can flow into the liquid storage portion 13 from the air communication portion, and the pressure in the liquid storage portion 13 is maintained at the atmospheric pressure. The supply port is a discharge port capable of discharging the ink in the liquid storage portion 13 to the outside of the liquid storage portion 13. The liquid storage portion 13 and the liquid ejecting portion 50 are in communication with each other by the supply flow path 40. The ink in the liquid storage portion 13 is supplied toward the liquid ejecting portion 50 via the supply port coupled to the supply flow path 40.

As illustrated in FIG. 2, when the scanner 5 takes an open posture with respect to the apparatus main body 2, the cover 11 that covers the upper portion of the liquid storage portion 13 in the liquid storage unit 10 is completely exposed. The cover 11 is pivotably attached to the housing 12. By making the cover 11 completely exposed, and pivoting the cover 11 with respect to the housing 12, the upper portion of the liquid storage portion 13 can be exposed.

A pour port (not illustrated) and a lid 16 which seals the pour port and is pivotable with respect to the liquid storage portion 13 are provided on the upper portion of the liquid storage portion 13. When the cover 11 takes a posture of exposing the upper portion of the liquid storage portion 13 and the lid 16 opens the pour port, by connecting a refilling container (not illustrated) containing the ink and the pour port, the ink in the refilling container is refilled to the liquid storage portion 13 via the pour port.

Figure 3:
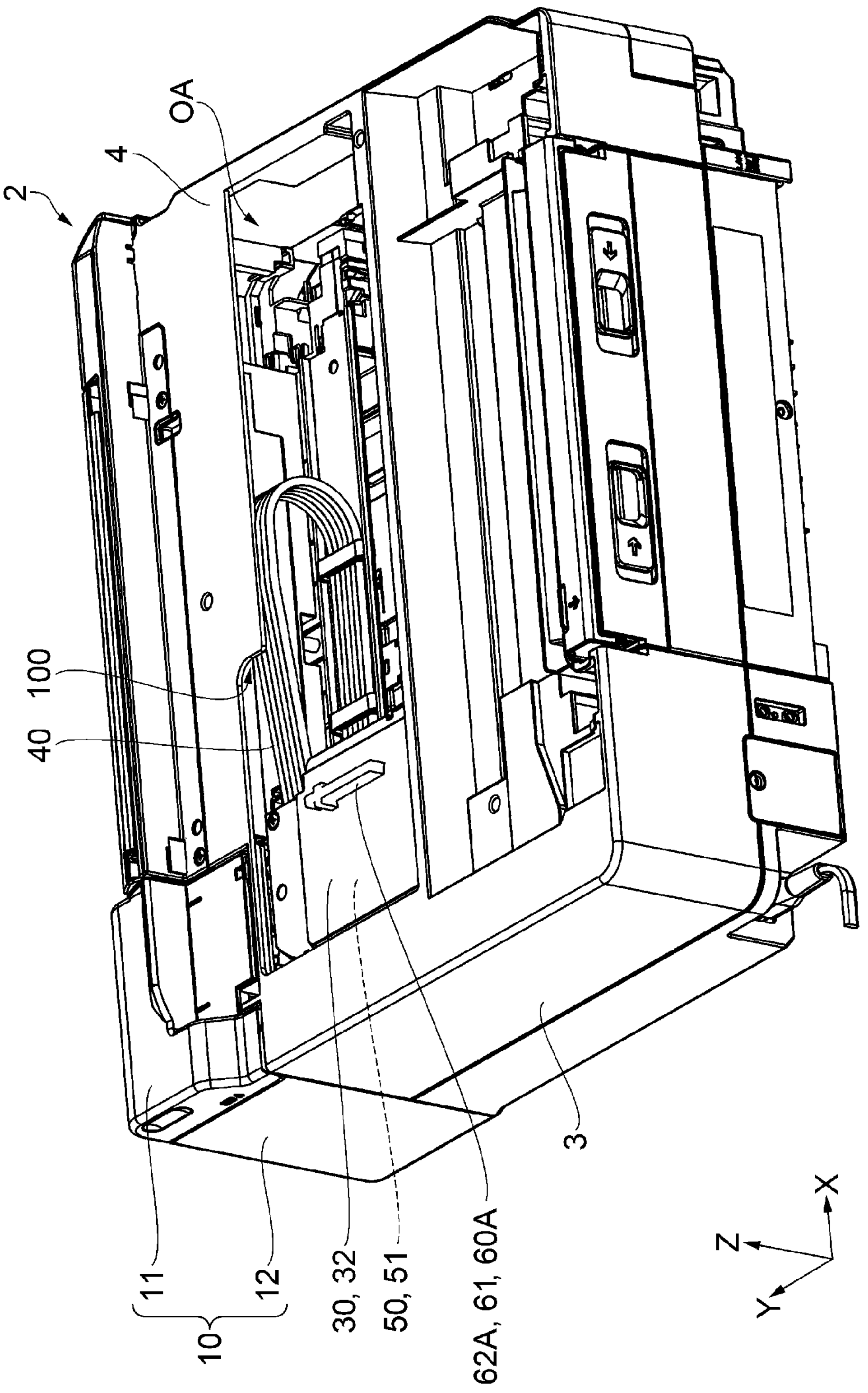
FIG. 3 is a perspective view of the liquid ejecting apparatus according to Embodiment 1 when a scanner is removed.
Figure 4:
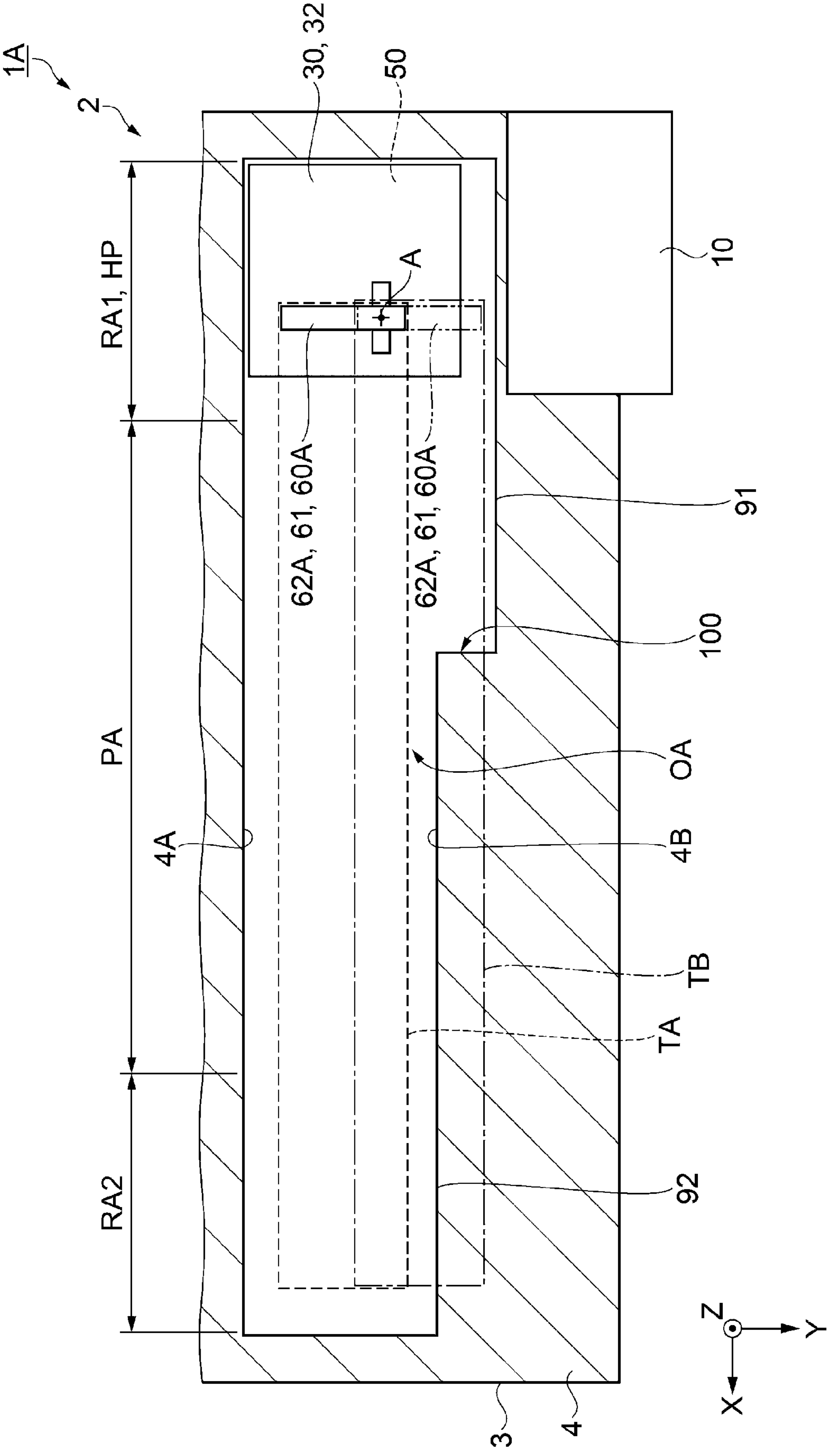
FIG. 4 is a schematic view of the liquid ejecting apparatus according to Embodiment 1 when viewed from a Z (+) direction side.

FIG. 3 is a perspective view of the liquid ejecting apparatus 1A when the scanner 5 is removed. FIG. 4 is a schematic view of the liquid ejecting apparatus 1A when viewed from the Z (+) direction side. FIGS. 1 and 2 are perspective views of the liquid ejecting apparatus 1A as viewed from the Y (+) direction side (front side). On the other hand, FIG. 3 is a perspective view of the liquid ejecting apparatus 1A as viewed from the Y (−) direction side (rear side). In addition, in FIG. 3, a state where the carriage 30 is positioned at a home position HP is illustrated. In FIG. 4, the carriage 30, a lever 62A (operation portion 61), the housing 3, and the liquid storage unit 10 are schematically illustrated, and the illustration of the other components is not repeated. Furthermore, in FIG. 4, the Y (+) direction side of the apparatus main body 2 is illustrated, and the Y (−) direction side of the apparatus main body 2 is not repeated.

As illustrated in FIGS. 3 and 4, the carriage 30 is disposed on the Y (−) direction side of the liquid storage unit 10. The carriage 30 can reciprocate in the X direction (main scanning direction) by a driving force applied from a carriage motor 31 (refer to FIG. 5). The liquid ejecting portion 50 and the opening/closing mechanism 60A are mounted on the carriage 30.

A guide shaft (not illustrated) of the carriage motor 31 is provided with a drive pulley (not illustrated). In addition, a driven pulley (not illustrated) is provided in the apparatus main body 2 at an interval in the apparatus width direction (X direction) with respect to the drive pulley. An endless belt (not illustrated) is wound around the drive pulley and the driven pulley. At least a portion of the endless belt grips the carriage 30 at a grip portion (not illustrated) provided at an end portion on a rear side of the carriage 30. When the carriage motor 31 is rotationally driven, the endless belt rotates in the same direction as a rotation direction of the carriage motor 31, and reciprocates the carriage 30 in the apparatus width direction (X direction).

In addition, in the housing 3, a linear encoder 75 (refer to FIG. 5) for detecting a position and a velocity in the X direction (main scanning direction) of the carriage 30 that reciprocates is provided. The linear encoder 75 is configured to include a linear code plate (not illustrated) parallel to the X direction (main scanning direction) provided on the housing 3, and a photosensor 76 (refer to FIG. 5) provided on the carriage 30, and a predetermined electrical signal corresponding to a movement state of the carriage 30 is output from the photosensor 76.

In FIG. 4, a frame 4 forming a portion of the housing 3 is hatched. The frame 4 is a component of the housing 3 and is disposed on the Z (+) direction side with respect to the carriage 30. Therefore, in a side view as viewed from the Y direction side, the frame 4 and the carriage 30 do not overlap, and when the carriage 30 is moved in the X direction, the carriage 30 and the frame 4 do not interfere with each other. On the other hand, in the side view as viewed from the Y direction side, the frame 4 and the lever 62A overlap.

Furthermore, the frame 4 is provided with an opening OA. By providing the frame 4 with the opening OA, a user can access the carriage 30 disposed inside the apparatus main body 2, the lever 62A of the opening/closing mechanism 60A, and the like.

As illustrated in FIG. 4, when the carriage 30 is reciprocated along a guide axis extending in the X direction, a region where the carriage 30 moves includes a printing region PA where the liquid ejecting portion 50 performs printing, and a non-printing region RA where the liquid ejecting portion 50 does not perform printing. The non-printing region RA includes a non-printing region RA1 positioned on the X (−) direction side with respect to the printing region PA, and a non-printing region RA2 positioned on the X (+) direction side with respect to the printing region PA. The printing region PA is disposed between the two non-printing regions RA1 and RA2.

In the non-printing region RA1, a home position HP, which is a position where the carriage 30 stands by at the time of non-printing, is disposed. A side wall is provided on the X (−) direction side of the housing 3 and the carriage 30 moving in the X (−) direction side can come into contact with the side wall at the time of non-printing. A position of the carriage 30 when contacting the side wall is a reference position when the carriage 30 reciprocates in the X direction.

A plurality of relay adapters (not illustrated) are mounted on the carriage 30. The relay adapter is a container capable of temporarily storing the ink. The relay adapter is coupled to the liquid storage portion 13 via the supply flow path 40, and temporarily stores the ink. The ink stored in the liquid storage portion 13 is supplied to the liquid ejecting portion 50 via the supply flow path 40 and the relay adapter. The carriage 30 is a hollow container having a carriage cover 32 on the Z (+) direction side. The relay adapter is mounted on the carriage 30, in addition to the liquid ejecting portion 50 and the opening/closing mechanism 60A. The relay adapter is covered by the carriage cover 32 and disposed inside the carriage 30.

Furthermore, the opening/closing mechanism 60A mounted on the carriage 30 includes the lever 62A on the Z (+) direction side. The lever 62A of the opening/closing mechanism 60A protrudes upward from the carriage cover 32. That is, the lever 62A of the opening/closing mechanism 60A is disposed outside the carriage 30 and the other portion of the opening/closing mechanism 60A is disposed inside the carriage 30.

In addition, a liquid ejecting portion 50 is provided in the lower portion of the carriage 30. The liquid ejecting portion 50 includes a pressure generating chamber (not illustrated), a piezoelectric element (not illustrated), and a nozzle 51 (refer to FIG. 3). The nozzle 51 is positioned on the Z (−) direction side of the liquid ejecting portion 50, and is disposed to face the medium. The nozzle 51 communicates with the relay adapter via a flow path (not illustrated) provided in the liquid ejecting portion 50. The piezoelectric element vibrates a diaphragm (not illustrated) forming a portion of the pressure generating chamber to cause pressure fluctuation in the pressure generating chamber, and the ink is ejected from the nozzle 51 to the medium by using the pressure fluctuation. The lower surface of the liquid ejecting portion 50 is configured as a nozzle surface provided with a plurality of nozzles 51. Although illustration is not repeated, as an example, the plurality of nozzles 51 are arranged along the apparatus depth direction (Y direction) to form a nozzle row. As described above, the liquid ejecting portion 50 includes the nozzle 51 ejecting the ink to the medium.

Furthermore, in the present embodiment, a maintenance unit 55 (refer to FIG. 5) that performs maintenance on the liquid ejecting portion 50 including cleaning of the nozzles 51 is disposed immediately below the carriage 30 moved to the home position HP. The maintenance unit 55 is provided with, for example, a cap (not illustrated) that can abut on the liquid ejecting portion 50 so as to surround the nozzle 51, and performs the cleaning of the nozzles 51 by depressurizing the space formed by abutting of the cap and discharging unnecessary ink or bubbles in the nozzle 51.

In addition, in the present embodiment, a liquid receiving portion (not illustrated) is provided immediately below the carriage 30 where the carriage 30 is moved to the non-printing region RA2. The liquid receiving portion stores the ink discharged from the nozzle 51 by idle discharge, which is a type of maintenance. The idle discharge is to discharge the ink not used for printing from the nozzle 51 by driving the piezoelectric element, and to release thickening of the ink in the nozzle 51.

About Control Portion

Figure 5:
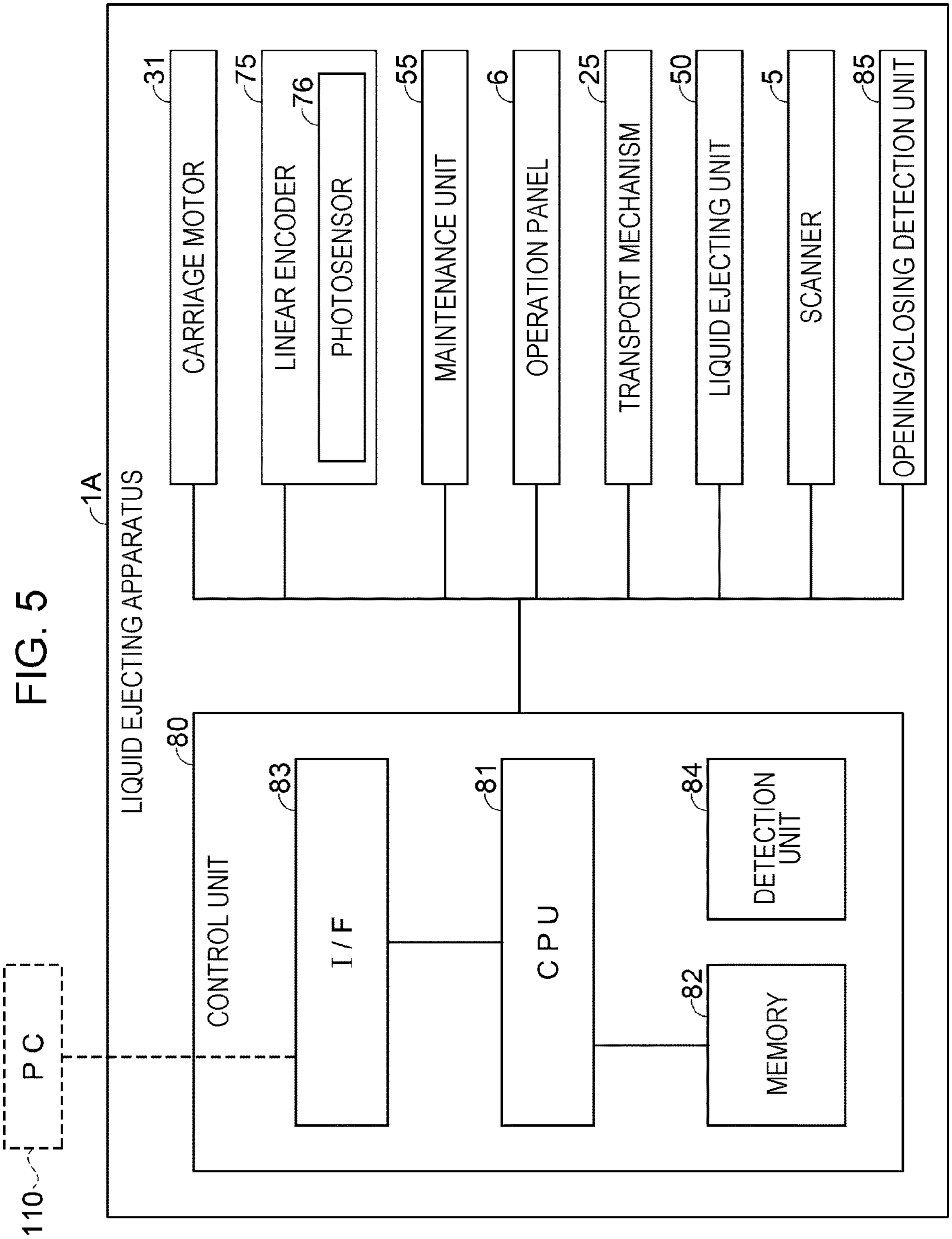
FIG. 5 is a block diagram illustrating an electrical configuration of the liquid ejecting apparatus according to Embodiment 1.

FIG. 5 is a block diagram illustrating an electrical configuration of the liquid ejecting apparatus 1A according to the present embodiment. As illustrated in FIG. 5, the control portion 80 includes a central processing unit (CPU) 81, a memory 82, an interface portion (I/F) 83, a detection portion 84, and the like, which are provided on the control substrate.

The OF 83 transmits and receives data between an external personal computer (PC) 110 and the liquid ejecting apparatus 1A. The PC 110 and the liquid ejecting apparatus 1A may be directly coupled by a cable or the like, or may be coupled indirectly via a network or the like. In addition, data may be transmitted and received between the PC 110 and the liquid ejecting apparatus 1A via wireless communication.

The CPU 81 is an arithmetic processing unit for controlling the entire liquid ejecting apparatus 1A. The memory 82 is a storage medium that secures a region storing, an operation region operating a program in which the CPU 81 operates, and the like, and is formed of a storage element such as a RAM or an EPROM.

The control portion 80 creates a print data based on an image data output from the PC 110, and controls the liquid ejecting portion 50, the transport mechanism 25, the carriage motor 31 and the like based on the print data. The PC 110 may create a print data, and the control portion 80 may control the liquid ejecting portion 50, the transport mechanism 25, the carriage motor 31, and the like based on the print data received from the PC 110. Furthermore, the control portion 80 may create a print data based on an operation command input by the user via the operation button 8 of the operation panel 6, and may control the liquid ejecting portion 50, the transport mechanism 25, and the carriage motor 31, and the like based on the print data.

In addition, the control portion 80 drives the piezoelectric element provided in the liquid ejecting portion 50 to eject the ink from the plurality of nozzles 51 toward the medium. Furthermore, the control portion 80 supplies a drive signal to drive the carriage motor 31. Furthermore, the control portion 80 controls the carriage motor 31, the transport mechanism 25, the liquid ejecting portion 50, and the like to record an image on the medium.

Here, the printing operation of the medium of the liquid ejecting apparatus 1A will be described. The medium stored in the medium storage portion 22 is transported by the transport mechanism 25 from the upstream to the downstream in a transport direction intersecting the main scanning direction. The transport mechanism 25 transports the medium to a platen (not illustrated) provided in a region facing the liquid ejecting portion on the lower side of the liquid ejecting portion 50. The ink is ejected from the nozzle 51 of the liquid ejecting portion 50 to the surface of the medium supported by the platen, which faces the liquid ejecting portion 50. As a result, printing is performed on the surface of the medium facing the liquid ejecting portion 50. The medium on which the printing is performed is discharged toward the medium discharge tray.

The control portion 80 receives an electrical signal output from the linear encoder (photosensor 76) for detecting the position and velocity of the carriage 30 that moves with the driving of the carriage motor 31.

The control portion 80 drives the transport mechanism 25 to move the medium in the transport direction intersecting the X direction (main scanning direction). The control portion 80 controls the maintenance unit 55 to perform a maintenance operation on the liquid ejecting portion 50.

The control portion 80 receives a command from the operation button 8 operated by the user and performs various controls. The control portion 80 receives an open/closed state of the scanner 5 by an opening/closing detection portion 85 formed of an optical sensor (not illustrated) or the like.

The control portion 80 calculates the position and a movement speed of the carriage 30 in the X direction (main scanning direction) using the electrical signal output from the linear encoder 75 (photosensor 76). That is, the control portion 80 controls the movement of the carriage 30. The detection portion 84 in the control portion 80 detects a driving load of the carriage motor 31 by detecting a rotational torque of the carriage motor 31. Although the details will be described later, the detection portion 84 detects the contact between the opening/closing mechanism 60A (lever 62A) and a contact portion 100 by the driving load of the carriage motor 31.

The control portion 80 brings the carriage 30 into contact with the side wall of the housing 3 by moving the carriage 30 in the X (−) direction. When the carriage 30 comes in contact with the side wall of the housing 3, the carriage 30 is inhibited from moving in the X (−) direction and stops. The carriage 30 is inhibited from moving in the X (−) direction, so that the driving load of the carriage motor 31 is increased. The control portion 80 uses the position of the carriage 30 when the detection portion 84 detects an increase in the driving load of the carriage motor 31 as a reference position, and defines each position of the home position HP in the X direction, the non-printing region RA1, the non-printing region RA2, and the printing region PA. The home position HP may be provided at a position when the carriage 30 is stopped by contacting the side wall of the housing 3 or provided at a position moved from the stop position of the carriage 30 in the X (+) direction.

About Opening/Closing Mechanism

Figure 6:
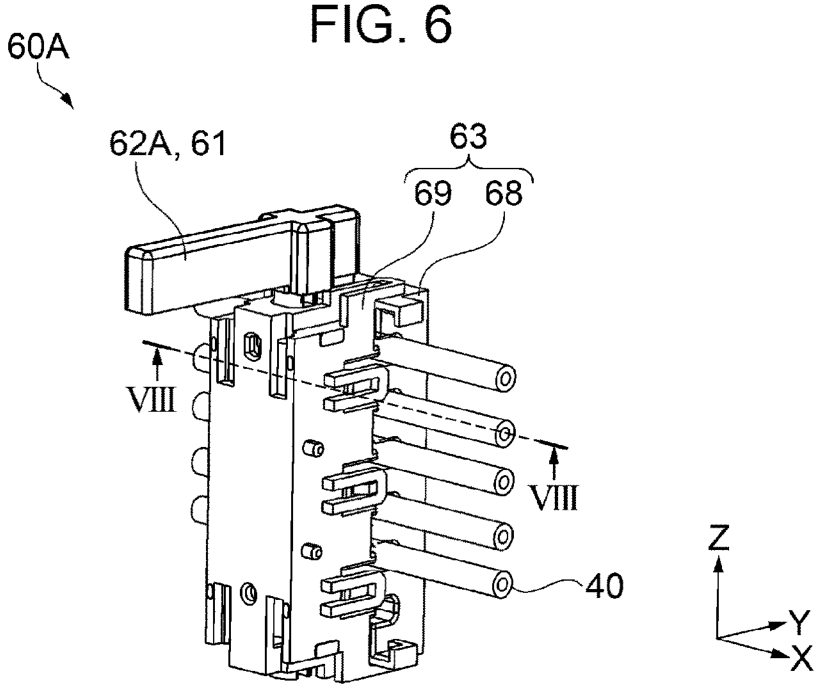
FIG. 6 is a perspective view of an opening/closing mechanism according to Embodiment 1.
Figure 7:
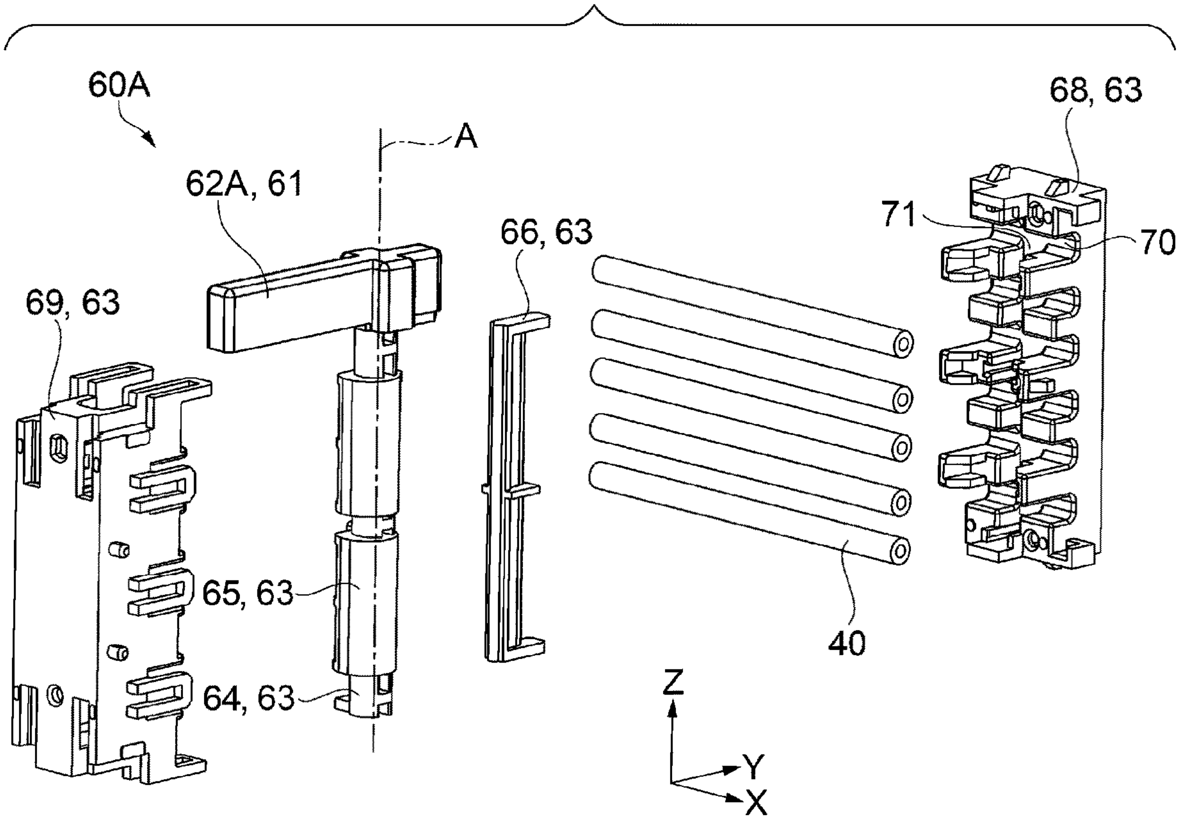
FIG. 7 is an exploded perspective view of the opening/closing mechanism according to Embodiment 1.
Figure 8B:
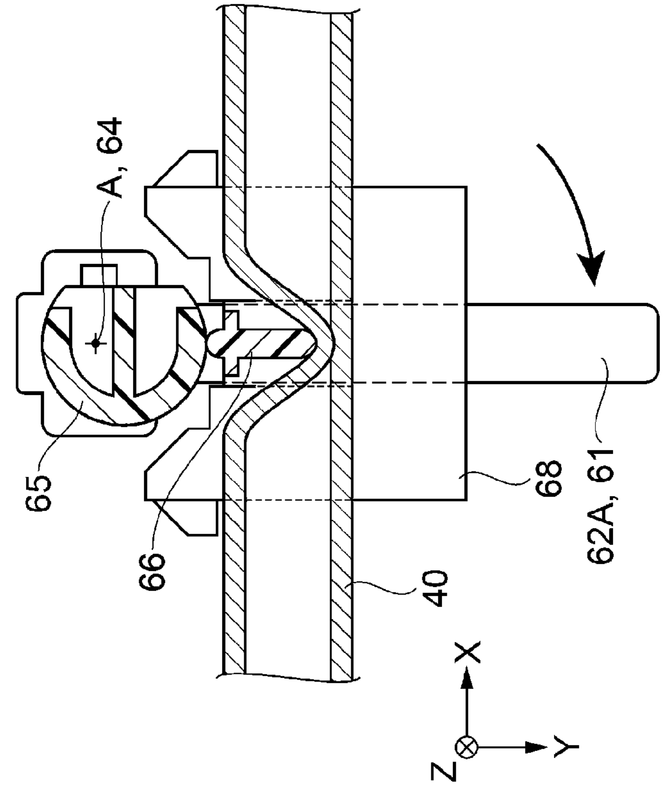
FIG. 8B is an arrow cross-sectional view taken along line VIII-VIII in FIG. 6 of the opening/closing mechanism according to Embodiment 1 in a state where the supply flow path is blocked.
Figure 8A:
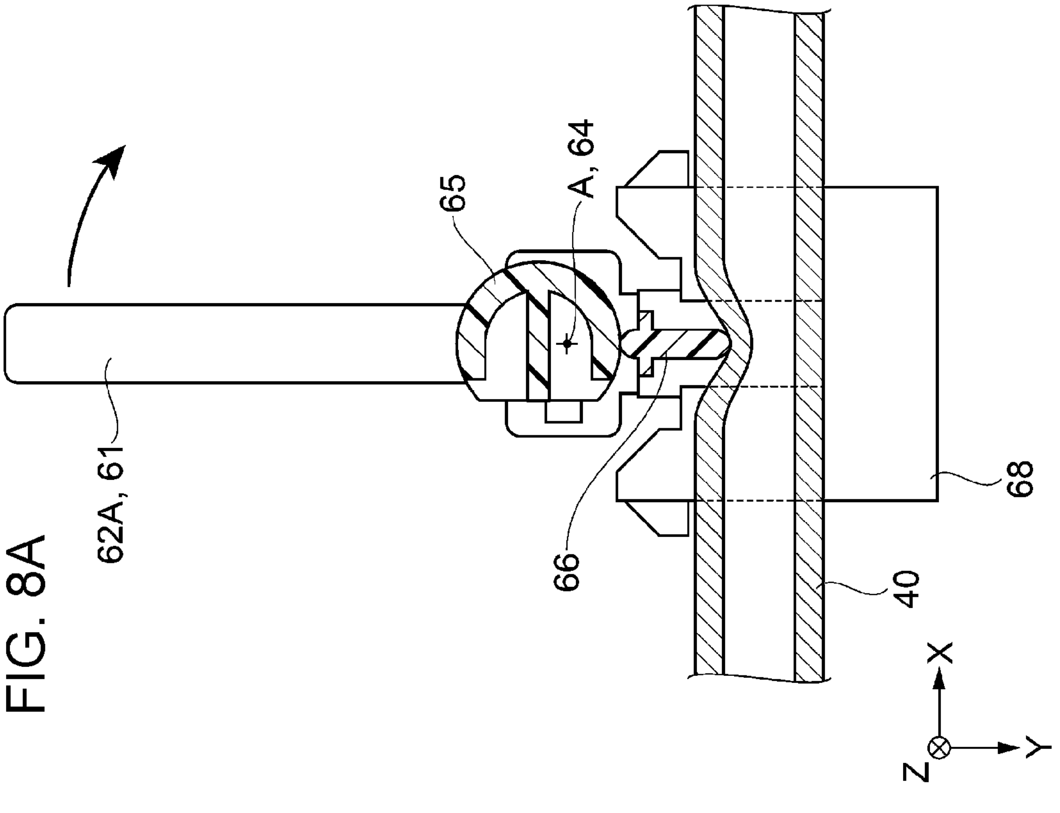
FIG. 8A is an arrow cross-sectional view taken along line VIII-VIII in FIG. 6 of the opening/closing mechanism according to Embodiment 1 in a state where a supply flow path is opened.

FIG. 6 is a perspective view of the opening/closing mechanism 60A. FIG. 7 is an exploded perspective view of the opening/closing mechanism 60A. FIGS. 8A and 8B are arrow cross-sectional views taken along line VIII-VIII in FIG. 6 of the opening/closing mechanism 60A as viewed from the Z (−) direction side. In FIGS. 8A and 8B, a case 69 is not repeated. FIG. 8A illustrates a state where the supply flow path 40 is opened, and FIG. 8B illustrates a state where the supply flow path 40 is blocked. Next, the opening/closing mechanism 60A will be described using FIGS. 6, 7, 8A, and 8B.

As illustrated in FIGS. 6 and 7, the opening/closing mechanism 60A includes an opening/closing portion 63 for bringing the supply flow path 40 into the open state or the closed state and the operation portion 61 for operating the opening/closing portion 63. The opening/closing portion 63 includes a supply flow path support portion 68, a shaft portion 64, a pressing member 66, a cam member 65, and the case 69. The operation portion 61 includes the lever 62A. The case 69 and the supply flow path support portion 68 are exterior frames of the opening/closing portion 63 (opening/closing mechanism 60A). The shaft portion 64, the cam member 65, and the pressing member 66 are disposed between the case 69 and the supply flow path support portion 68 in order from the case 69 side. Furthermore, the supply flow path 40 is disposed between the pressing member 66 and the supply flow path support portion 68.

The supply flow path support portion 68 is provided with a plurality of grooves 70 extending in the X direction. The plurality of grooves 70 are aligned along the Z direction. The supply flow path 40 is inserted into the groove 70. As a result, the five supply flow paths 40 are arranged along the Z direction in the supply flow path support portion 68. The pressing member 66 is disposed so as to be able to press the five supply flow paths 40 between the pressing member 66 and the supply flow path support portion 68. The shaft portion 64 is a member elongated in the Z direction, and the cam member 65 is provided in a portion facing the pressing member 66 of the shaft portion 64. Furthermore, the operation portion 61 (lever 62A) is provided at an end on the Z (+) direction side of the shaft portion 64. In the present embodiment, the shaft portion 64, the cam member 65, and the lever 62A are prepared by integral molding using resin. In addition, the case 69, the pressing member 66, and the supply flow path support portion 68 are all molded articles of resin.

The lever 62A and the cam member 65 can pivot about a pivot axis A of the shaft portion 64 indicated by a one-dot chain line in the drawing as a pivot center. In a state where the opening/closing mechanism 60A is mounted on the carriage 30, the pivot axis A is disposed along the Z direction. Since the lever 62A is disposed outside the carriage 30, when the user grips the lever 62A by hand and rotates the lever 62A, the cam member 65 rotates in interlocked with the rotation of the lever 62A.

The supply flow path support portion 68 is provided with a recessed portion 71 into which the pressing member 66 can be inserted. The pressing member 66 is inserted into the recessed portion 71 of the supply flow path support portion 68 and is movable along the recessed portion 71. For example, the pressing member 66 is movable to a position abutting on a bottom portion of the recessed portion 71. That is, the recessed portion 71 guides the movement direction of the pressing member 66.

The pressing member 66 is disposed so as to interpose the supply flow path 40 disposed in the groove 70 between the pressing member 66 and the supply flow path support portion 68. The five supply flow paths 40 are disposed between the supply flow path support portion 68 and the pressing member 66, and can be pressed by the supply flow path support portion 68 and the pressing member 66.

The shaft portion 64 extends in the Z direction, and has a length extending across the five supply flow paths 40 aligned in the Z direction in the supply flow path support portion 68. The two cam members 65 are provided on the shaft portion 64 and are aligned along the Z direction. The cam member 65 is disposed at a position abutting on the pressing member 66.

As illustrated in FIGS. 8A and 8B, the rotation center of the cam member 65 is different from the rotation center (pivot axis A) of the shaft portion 64, and the rotation center of the cam member 65 is eccentric to the shaft portion 64. When the cam member 65 rotates in interlocked with the rotation of the shaft portion 64, the cam member 65 rotates in an eccentric state. As a result, the position of an outer peripheral surface of the cam member 65 abutting on the pressing member 66 is changed, and the position of the pressing member 66 is changed. In the state illustrated in FIG. 8A where the supply flow path 40 is opened, when the lever 62A is rotated in a clockwise direction indicated by an arrow in the drawing and the shaft portion 64 and the cam member 65 are rotated clockwise, the position of the pressing member 66 changes in the direction where the pressing member 66 approaches the supply flow path support portion 68. When the pressing member 66 approaches the supply flow path support portion 68, as illustrated in FIG. 8B, the supply flow path 40 is pressed by the pressing member 66 and the supply flow path support portion 68, the supply flow path 40 is collapsed, and the supply flow path 40 is blocked (closed state).

When the lever 62A illustrated in FIG. 8A is rotated clockwise, the pressing member 66 approaches the supply flow path support portion 68, as illustrated in FIG. 8B, the supply flow path 40 is in the collapsed state, the supply flow path 40 is blocked, and the communication of the inks between the liquid storage portion 13 and the liquid ejecting portion 50 is interrupted. That is, the supply flow path 40 is in the closed state. At this time, the supply flow path 40 may not be completely closed. When the lever 62A illustrated in FIG. 8B is rotated counterclockwise, the pressing member 66 moves away from the supply flow path support portion 68, as illustrated in FIG. 8A, the collapse of the supply flow path 40 is released, the supply flow path 40 is opened, and the communication of the inks between the liquid storage portion 13 and the liquid ejecting portion 50 is allowed. That is, the supply flow path 40 is in the open state. As described above, the opening/closing portion 63 includes the pressing member 66 that blocks the supply flow path 40 when the lever 62A is in the closed position and opens the supply flow path 40 when the lever 62A is in the open position.

The position of the lever 62A illustrated in FIG. 8A is an open position where the supply flow path 40 is in the open state. The position of the lever 62A illustrated in FIG. 8B is a closed position where the supply flow path 40 is in the closed state. The lever 62A pivots between the open position opening the supply flow path 40 and the closed position blocking the supply flow path 40 by rotating about the pivot axis A of the shaft portion 64. As described above, the operation portion 61 includes the lever 62A that can pivot between the open position where the supply flow path 40 is in the open state and the closed position where the supply flow path 40 is in the closed state. The operation portion 61 (lever 62A) is movable between the open position opening the supply flow path 40 and the closed position closing the supply flow path 40. In other words, the operation portion 61 includes the lever 62A pivotable about the shaft portion 64 between the open position opening the supply flow path 40 and the closed position closing the supply flow path 40.

Returning to FIGS. 6 and 7, the case 69 is configured to be engageable with the supply flow path support portion 68, and covers the shaft portion 64, the pressing member 66, and the cam member 65 from the Y (−) direction side. As a result, the shaft portion 64, the pressing member 66, and the cam member 65 are protected by the case 69 and the supply flow path support portion 68.

As described above, the opening/closing mechanism 60A opens and closes the five supply flow paths 40. For example, when the liquid ejecting apparatus 1A is moved or transported, that is, when the liquid ejecting apparatus 1A is transported, in a case in which the opening/closing mechanism 60A is blocked, the ink is unlikely to leak from the nozzle 51 of the liquid ejecting portion 50. Specifically, when the liquid ejecting apparatus 1A is transported, vibration or impact acts on the ink in the liquid storage portion 13 or the supply flow path 40. When the vibration or impact acts on the ink in the liquid storage portion 13 or the supply flow path 40, pressure acts on the ink in the nozzle 51 of the liquid ejecting portion 50, and there is a possibility that the ink may leak from the nozzle 51 of the liquid ejecting portion 50. When the supply flow path 40 is blocked by the opening/closing mechanism 60A before transporting the liquid ejecting apparatus 1A, in a case of transporting the liquid ejecting apparatus 1A, the pressure fluctuation acting on the ink in the liquid ejecting portion 50 can be suppressed to a low level, and the possibility of the ink leaking from the nozzle 51 of the liquid ejecting portion 50 can be suppressed.

In the present embodiment, the user manually puts the lever 62A in the closed position, and the liquid ejecting apparatus 1A is transported in the closed state of the supply flow path 40. When the transport of the liquid ejecting apparatus 1A is completed, the user manually changes the lever 62A from the closed position to the open position, and brings the supply flow path 40 into the open state. However, since the user manually operates the lever 62A to the closed position or the open position, even when the transport of the liquid ejecting apparatus 1A is completed, the user forgets to change the lever 62A from the closed position to the open position. Therefore, there is a possibility that a problem may occur in which the printing processing is performed in a state where the supply flow path 40 is blocked, the ink is not ejected from the liquid ejecting portion 50, and an image is not formed on the medium.

Since the present embodiment has an excellent configuration that causes the problem to be unlikely to occur in which the user forgets to change the lever 62A from the closed position to the open position after the transport of the liquid ejecting apparatus 1A is completed, and the printing processing is performed in the state where the supply flow path 40 is blocked, the details will be described below.

About Detection Method of Open/Closed State of Supply Flow Path

In FIG. 4, the lever 62A in the open position is illustrated by a solid line, and the lever 62A in a closed position is illustrated by a two-dot chain line. The lever 62A in the open position is the lever 62A disposed at a position where the supply flow path 40 is in the open state. The lever 62A in the closed position is the lever 62A disposed at a position where the supply flow path 40 is in the closed state. That is, the supply flow path 40 is opened when the lever 62A is positioned at the solid line position in FIG. 4, and the supply flow path 40 is closed when the lever 62A is positioned at the two-dot chain line position in FIG. 4. Furthermore, in FIG. 4, when the opening/closing mechanism 60A (lever 62A) is moved together with the carriage 30 from the home position HP position in the X (+) direction, a movement region TA in which the lever 62A in the open position moves is illustrated by a dashed line, and the movement region TB in which the lever 62A in the closed position moves is illustrated by a one-dot chain line. In addition, in the following description, the movement region TA in which the lever 62A in the open position moves with the movement of the carriage 30 is referred to as the movement region TA of the lever 62A in the open position. The movement region TB in which the lever 62A in the closed position moves with the movement of the carriage 30 is referred to as a movement region TB of the lever 62A in the closed position. Hereinafter, with reference to FIG. 4, a detection method of the open/closed state of the supply flow path 40, that is, a detection method of the liquid ejecting apparatus 1A according to the present embodiment will be described.

As illustrated in FIG. 4, when the lever 62A in the open position illustrated by the solid line in the drawing is rotated 180° counterclockwise, the lever 62A becomes the closed position illustrated by a two-dot chain line in the drawing. Furthermore, when the lever 62A in the closed position illustrated by the two-dot chain line in the drawing is rotated 180° clockwise, the lever 62A becomes the open position illustrated by the solid line in the drawing. As described above, the positions of the lever 62A in the open position and the lever 62A in the closed position are different from each other.

An end 4A on the Y (−) direction side of the frame 4 is disposed on the Y (−) direction side of the opening OA, and an end 4B on the Y (+) direction side of the frame 4 is disposed on the Y (+) direction side of the opening OA. The opening OA is provided between the end 4A on the Y (−) direction side of the frame 4 and the end 4B on the Y (+) direction side of the frame 4. The end 4B on the Y (+) direction side of the frame 4 includes a portion 91 disposed on the home position HP side (X (−) direction side), and a portion 92 disposed on the side (X (+) direction side) opposite to the home position HP. At the end 4B on the Y (+) direction side of the frame 4, the portion 92 is disposed near the end 4A on the Y (−) direction side of the frame 4, and the portion 91 is disposed far from the end 4A on the Y (−) direction side of the frame 4. That is, a distance between the portion 92 and the end 4A on the Y (−) direction side of the frame 4 is shorter than a distance between the portion 91 and the end 4A on the Y (−) direction side of the frame 4. Therefore, at the end 4B on the Y (+) direction side of the frame 4, the portion 92 protrudes further to the Y (−) direction side than the portion 91. Furthermore, at the end 4B on the Y (+) direction side of the frame 4, the end on the X (−) direction side of the portion 92 protruding to the Y (−) direction side is the contact portion 100. As described above, the contact portion 100 is provided on the frame 4. Furthermore, since the frame 4 is a component of the housing 3, the contact portion 100 is provided in the housing 3 that stores the liquid ejecting portion 50 and the carriage 30.

In a top view viewed from the Z (+) direction side, the portions 91 and 92 (contact portions 100) of the frame 4 are disposed outside the movement region TA of the lever 62A in the open position, and when the opening/closing mechanism 60A (lever 62A) is moved together with the carriage 30 from the position of the home position HP in the X (+) direction, the lever 62A in the open position does not overlap the portions 91 and 92 of the frame 4. Therefore, when the opening/closing mechanism 60A (lever 62A) is moved together with the carriage 30 from the position of the home position HP in the X (+) direction, the lever 62A in the open position and the frame 4 do not interfere (contact) with each other. As a result, the movement of the carriage 30 is not inhibited. In other words, since the contact portion 100 is disposed outside the movement region TA where the operation portion 61 (lever 62A) positioned at the open position moves with the movement of the carriage 30, the contact portion 100 and the operation portion 61 (lever 62A) do not interfere with each other, and the movement of the carriage 30 is not inhibited. As described above, the lever 62A (operation portion) does not come in contact with the contact portion 100 when the carriage 30 is moved in the open state of the supply flow path 40.

In the top view viewed from the Z (+) direction, the portion 91 of the frame 4 is disposed outside the movement region TB of the lever 62A in the closed position, and the portion 92 (contact portion 100) of the frame 4 is disposed inside the movement region TB of the lever 62A in the closed position. When the opening/closing mechanism 60A (lever 62A) is moved together with the carriage 30 from the position of the home position HP in the X (+) direction, the lever 62A in the closed position does not overlap the portion 91 of the frame 4, and overlaps the portion 92 (contact portion 100) of the frame 4. As described above, the contact portion 100 is disposed inside the movement region TB where the operation portion 61 (lever 62A) positioned at the closed position moves with the movement of the carriage 30. Furthermore, in a side view viewed from the Y direction side, since the frame 4 and the lever 62A overlap with each other, when the carriage 30 positioned at the home position HP is moved in the X (+) direction, although the lever 62A in the open position is not in contact with the portion 91 of the frame 4, the lever 62A in the closed position is in contact with the portion 92 (contact portion 100) of the frame 4. As a result, the movement of the carriage 30 is inhibited. That is, when the carriage 30 is moved in the closed state of the supply flow path 40 (when the lever 62A in the closed position is moved together with the carriage 30), the lever 62A (opening/closing mechanism 60A) in the closed position comes in contact with the contact portion 100. In other words, the contact portion 100 comes in contact with the operation portion 61 (lever 62A) when the carriage 30 is moved in the closed state of the supply flow path 40. As described above, the lever 62A (operation portion) comes in contact with the contact portion 100 when the carriage 30 is moved in the closed state of the supply flow path 40.

Furthermore, in the side view viewed from the Y direction side, since the carriage and the frame 4 do not overlap with each other, when the carriage 30 positioned at the home position HP is moved in the X (+) direction, the carriage 30 and the frame 4 do not interfere with each other, and the movement of the carriage 30 is not inhibited.

When the carriage 30 positioned at the home position HP is moved in the X (+) direction, in the top view viewed from the Z (+) direction, the carriage 30 overlaps the portion 92 (contact portion 100) of the frame 4. Even when the carriage 30 is moved in the X (+) direction, the carriage 30 does not interfere with the portion 92 (contact portion 100) of the frame 4, and the movement of the carriage 30 is not inhibited.

As described above, in the present embodiment, when the opening/closing mechanism 60A is moved in the X (+) direction together with the carriage 30 positioned at the home position HP, the frame 4 is provided with an opening OA so that the lever 62A positioned at the open position does not come in contact with the contact portion 100 of the frame 4, and the lever 62A positioned at the closed position comes in contact with the contact portion 100 of the frame 4. When the opening/closing mechanism 60A is moved in the X (+) direction together with the carriage 30 positioned at the home position HP, the lever 62A positioned at the closed position comes in contact with the contact portion 100 of the frame 4, and the movement of the carriage 30 is inhibited.

In the present embodiment, the user turns off the liquid ejecting apparatus 1A, changes the lever 62A from the open position to the closed position, and transports the liquid ejecting apparatus 1A. With this configuration, even when the user transports the liquid ejecting apparatus 1A with the ink filled, the ink does not leak. Furthermore, when the transport of the liquid ejecting apparatus 1A is completed, the user changes the lever 62A from the closed position to the open position, turns on the liquid ejecting apparatus 1A, and resumes printing on the medium such as a sheet.

In the present embodiment, when the power of the liquid ejecting apparatus 1A is turned off, the carriage 30 is in a standby state at the home position HP. Furthermore, when the transport of the liquid ejecting apparatus 1A is completed and the liquid ejecting apparatus 1A is turned on, the control portion 80 moves the carriage 30 positioned at the home position HP in the X (+) direction (first direction).

When the user forgets to change the lever 62A from the closed position to the open position, the lever 62A is in the closed position, and the carriage 30 positioned at the home position HP is moved in the X (+) direction, since the lever 62A positioned at the closed position comes in contact with the contact portion 100 of the frame 4, the movement of the carriage 30 is inhibited, the carriage 30 is stopped, and the driving load of the carriage motor 31 is increased.

The detection portion 84 normally detects the driving load of the carriage motor 31. Specifically, when the carriage 30 on which the opening/closing mechanism 60A is mounted is moved from the home position HP in the X (+) direction, the driving load of the carriage motor 31 exceeds a predetermined threshold value (threshold value stored in the memory 82), and the movement of the carriage 30 is inhibited, the detection portion 84 detects the contact between the contact portion 100 and the lever 62A. When the detection portion 84 detects the contact between the contact portion 100 and the lever 62A, the control portion 80 determines that the supply flow path 40 is in the closed state. In addition, when the carriage 30 on which the opening/closing mechanism 60A is mounted is moved from the home position HP in the X (+) direction, and the driving load of the carriage motor 31 does not exceed the predetermined threshold value, the control portion 80 determines that the contact portion 100 and the lever 62A are not in contact with each other, and the supply flow path 40 is in the open state. As described above, when the transport of the liquid ejecting apparatus 1A is completed and the power of the liquid ejecting apparatus 1A is turned on, the control portion 80 moves the carriage 30, and determines whether the supply flow path 40 is in the open state or the supply flow path 40 is in the closed state. In other words, in the detection method of the liquid ejecting apparatus 1A according to the present embodiment, the carriage 30 is moved with power on, and the state of the supply flow path 40 is detected by the movement of the carriage 30.

In addition, the detection method of the liquid ejecting apparatus 1A according to the present embodiment detects that the supply flow path 40 is in the closed state by the movement of the carriage 30. In other words, when the carriage 30 is moved, the detection method of the liquid ejecting apparatus 1A according to the present embodiment detects that the supply flow path 40 is in the closed state in a case in which the movement of the carriage 30 is inhibited. Furthermore in other words, in the detection method of the liquid ejecting apparatus 1A according to the present embodiment, the liquid ejecting apparatus 1A is provided with the carriage motor 31 for moving the carriage 30, and the method detects that the supply flow path 40 is in the closed state by the driving load of the carriage motor 31. The threshold value used as a reference for determining that the supply flow path 40 is in the closed state is set between the driving load of the carriage motor 31 when the carriage 30 is moved in the X direction and the driving load of the carriage motor 31 in a case in which the movement of the carriage 30 is inhibited. That is, the threshold value used as a reference for determining that the supply flow path 40 is in the closed state is larger than the driving load of the carriage motor 31 when the carriage 30 is moved in the X direction, and is smaller than the driving load of the carriage motor 31 in a case in which the movement of the carriage 30 is inhibited.

The control portion 80 may be configured to determine that the supply flow path 40 is in the closed state when the driving load of the carriage motor 31 detected by the detection portion 84 exceeds a predetermined threshold value for a certain period of time. There is a possibility that the driving load of the carriage motor 31 instantaneously rapidly increases due to a malfunction and exceeds the threshold value. In such a case, the control portion 80 erroneously detects that the movement of the carriage 30 is inhibited. When it is determined that the supply flow path 40 is in the closed state in a case in which the control portion 80 exceeds a predetermined threshold value for a certain period of time, even in a case in which the driving load of the carriage motor 31 instantaneously rapidly increases due to a malfunction, the possibility that the control portion 80 erroneously detects is reduced. Therefore, the control portion 80 can properly detect that the supply flow path 40 is in the closed state, since the lever 62A positioned at the closed position comes in contact with the contact portion 100 of the frame 4 and the movement of the carriage 30 is inhibited. For example, the fixed time described above is one second or more.

In addition, when the supply flow path 40 is in the open state, that is, when the lever 62A is in the open position, since the lever 62A in the open position does not come in contact with the contact portion 100 of the frame 4 even in a case in which the carriage 30 is moved in the X (+) direction (first direction), the driving load of the carriage motor 31 is smaller than the threshold value and does not exceed the threshold value. In such a case, the control portion 80 determines that the supply flow path 40 is open.

The control portion 80 moves the carriage 30 in the X (−) direction side when blocking (closed state) of the supply flow path 40 is detected. That is, when the control portion 80 moves the carriage 30 in the X (+) direction (first direction) in the X direction (main scanning direction) and detects the closed state of the supply flow path 40, the control portion 80 moves the carriage 30 in the X (−) direction (second direction) opposite to the X (+) direction (first direction) to move the carriage 30 to the home position HP. In the present embodiment, the X (+) direction corresponds to the “first direction in the main scanning direction”, and the X (−) direction corresponds to the “second direction opposite to the first direction”. When the carriage 30 is moved in the X (−) direction (second direction) and moved to the home position HP, the contact between the opening/closing mechanism 60A (lever 62A) mounted on the carriage 30 and the contact portion 100 of the frame 4 is released, and extra force is not applied to the carriage 30 or the opening/closing mechanism 60A. Furthermore, when the contact between the lever 62A and the contact portion 100 is released, the operation of changing the position of the lever 62A from the closed position to the open position is likely to be performed. When the control portion 80 detects the closed state of the supply flow path 40, that is, when the opening/closing mechanism 60A mounted on the carriage 30 comes in contact with the contact portion 100 of the frame 4, it is preferable that the control portion 80 temporarily stops the driving of the carriage motor 31 so that an extra force is not applied to the carriage 30 or the opening/closing mechanism 60A.

Furthermore, the control portion 80 inputs to the operation panel 6 a signal for notifying the user that the supply flow path 40 is in the closed state, and the operation panel 6 causes the display portion 7 of the operation panel 6 to display information based on the signal, that is, an alarm that the supply flow path 40 is in the closed state. That is, the operation panel 6 functions as a "notification portion" that notifies the user that the supply flow path 40 is in the closed state. In other words, the liquid ejecting apparatus 1A according to the present embodiment is provided with the operation panel 6 (notification portion) notifying that the supply flow path 40 is in the closed state. The "notification portion" notifying the user that the supply flow path 40 is in the closed state may be a flashing lamp (Patlight (registered trademark)), and may notify an alarm that the supply flow path 40 is in the closed state by light. The "notification portion" notifying the user that the supply flow path 40 is in the closed state may be a buzzer, and may notify an alarm that the supply flow path 40 is in the closed state by sound.

Based on information (alarm) displayed on the display portion 7 of the operation panel 6, the user reliably grasps that the supply flow path 40 is in the closed state. At the position of the home position HP, the user rotates the lever 62A clockwise by 180° as viewed from the Z (+) direction, changes the lever 62A from the closed position to the open position, and puts the supply flow path 40 in the open state. In the state where the lever 62A and the contact portion 100 are in contact with each other, it is difficult to rotate the lever 62A positioned at the closed position clockwise. Therefore in the present embodiment, the carriage 30 is moved to the X (−) direction side (second direction side) in order to rotate the lever 62A positioned at the closed position clockwise.

In addition, the lever 62A positioned at the closed position may be pivoted in the X (+) direction side (first direction side) and not pivoted in the X (−) direction side (second direction side). According to such a configuration, even when the lever 62A positioned at the closed position comes in contact with the contact portion 100, the lever 62A positioned at the closed position pivots in the X (−) direction side (second direction side). Therefore, it can be suppressed that the driving load is not applied to the carriage motor 31.

In addition, the contact portion 100 is provided on the X (−) direction side (second direction side) in the X direction in which the carriage 30 moves. Therefore, when the supply flow path 40 is in the closed state, the contact between the contact portion 100 and the lever 62A can be detected earlier than when the contact portion 100 is provided on the X (+) direction side (first direction side) in the X direction of the movement region TA of the carriage 30. Therefore, a throughput of the detection operation of the open/closed state of the supply flow path 40 can be improved.

In addition, the opening/closing mechanism 60A is provided on the X (+) direction side (first direction side) in the carriage 30. Therefore, the contact between the contact portion 100 and the lever 62A can be detected earlier than when the opening/closing mechanism 60A is provided on the X (−) direction side (second direction side) of the carriage 30. Therefore, the throughput of the detection operation of the open/closed state of the supply flow path 40 can be improved.

In addition, the movement speed of the carriage 30 at the time of detecting the open/closed state of the supply flow path 40 is set to be slower than the movement speed of the carriage 30 at the time of printing. In this manner, when the contact portion 100 and the lever 62A come into contact with each other, the application of a large force to the lever 62A and the contact portion 100 is suppressed, and for example, the problem that the contact portion 100 is deformed can be suppressed.

About Timing of Detection

Here, a timing at which the control portion 80 detects the open/closed state of the supply flow path 40 will be described. The timing at which the control portion 80 detects the open/closed state of the supply flow path 40 may be the time from when the power of the liquid ejecting apparatus 1A is turned on until the ink is first discharged from the nozzle 51 after the power is turned on. Specifically, the timing may be any one of the time from when the power of the liquid ejecting apparatus 1A is turned on until the first idle discharge is performed after the power is turned on, the time from when the power of the liquid ejecting apparatus 1A is turned on until the ink is discharged by the first cleaning after the power is turned on, and the time from when the power of the liquid ejecting apparatus 1A is turned on to until the ink is ejected for the first printing after the power is turned on. Furthermore, at any one of the timings described above, the open/closed state of the supply flow path 40 may be detected by an operation in which the carriage 30 is moved to the X (+) direction (first direction) side by a drive signal from the control portion 80 to the carriage motor 31 sent with the power on of the liquid ejecting apparatus 1A.

Another timing for detecting the open/closed state of the supply flow path 40 will be described. When the power is on, an opening/closing operation of the scanner 5 can be detected by the opening/closing detection portion 85. When the scanner 5 is opened, the operation portion 61 may be operated by the user and the supply flow path 40 may be blocked. There is a possibility that the scanner 5 may be closed while the user blocks the supply flow path 40. Therefore, the another timing is desirably the time from the opening/closing operation which is closed after the scanner 5 is opened until the ink is first discharged from the nozzle 51 after the opening/closing operation in a state where the power is on. Specifically, the another timing may be any one of the time from the opening/closing operation of the scanner 5 until the first idle discharge is performed after the opening/closing operation in the state where the power is on, the time from the opening/closing operation of the scanner 5 until the ink is discharged by the first cleaning after the opening/closing operation in the state where the power is on, and the time from the opening/closing operation of the scanner 5 until the ink is ejected for the first printing after the opening/closing operation in the state where the power is on. By performing the detection operation of the open/closed state of the supply flow path 40 at the above timing, it is possible to prevent the user from forgetting to close the supply flow path 40. Therefore, in the present embodiment, when the transport of the liquid ejecting apparatus 1A is completed and the power of the liquid ejecting apparatus 1A is turned on, the control portion 80 moves the carriage 30 positioned at the home position HP in the X (+) direction (first direction) to detect the open/closed state of the supply flow path 40.

As described above, in the liquid ejecting apparatus 1A according to the present embodiment, when the carriage 30 is moved in the main scanning direction (X direction) in the closed state of the supply flow path 40, the opening/closing mechanism comes in contact with the contact portion 100. When the carriage 30 is moved in the main scanning direction (X direction) in the open state of the supply flow path 40, the opening/closing mechanism 60A does not come in contact with the contact portion 100. Therefore, the control portion 80 can detect the open/closed state of the supply flow path by the contact between the opening/closing mechanism 60A and the contact portion 100. In the liquid ejecting apparatus 1A according to the present embodiment, the possibility that the user forgets to open the supply flow path 40 is suppressed, and furthermore, and the problem of printing when the supply flow path 40 is in the closed state is suppressed.

In addition, in the present embodiment, the open/closed state of the supply flow path 40 is detected using the opening/closing mechanism 60A, the housing 3 (frame 4), the carriage 30, the control portion 80 (detection portion 84), and the operation panel 6 among the components of the liquid ejecting apparatus 1A. Furthermore, the components (opening/closing mechanism 60A, housing 3, carriage 30, control portion 80, operation panel 6) for detecting the open/closed state of the supply flow path 40 are components for the liquid ejecting apparatus 1A to print on the medium. That is, in the present embodiment, since the liquid ejecting apparatus 1A detects the open/closed state of the supply flow path 40 by using the components for printing on the medium, it is possible to reduce the cost of the liquid ejecting apparatus 1A without requiring a new component to detect the open/closed state of the supply flow path 40, compared to the case where a new component is required to detect the open/closed state of the supply flow path 40.

Hereinafter, the effects of the liquid ejecting apparatus 1A according to the present embodiment will be described. (1-1) In order to open and close the supply flow path 40 by operating the operation portion 61 manually, when the liquid ejecting apparatus 1A is transported and printing is resumed in a state where the liquid ejecting apparatus 1A is filled with ink, it may forget to open the supply flow path 40. In that respect, when the carriage 30 is moved in the closed state of the supply flow path 40, the detection portion 84 can detect that the opening/closing mechanism 60A is in contact with the contact portion 100. As a result, the possibility that the user forgets to open the supply flow path 40 can be suppressed.

(1-2) The contact portion 100 is provided in the housing 3 (frame 4) storing the liquid ejecting portion 50 and the carriage 30. Since the housing 3 has high rigidity, the contact portion 100 is unlikely to be deformed, and the detection portion 84 can stably detect the contact between the opening/closing mechanism 60A and the contact portion 100.

(1-3) The contact portion 100 comes in contact with the operation portion 61 (lever 62A in closed position) when the carriage 30 is moved in the closed state of the supply flow path 40. As a result, when the carriage 30 is moved in the closed state of the supply flow path 40, since the detection portion 84 can detect that the operation portion 61 and the contact portion 100 are in contact with each other, the possibility that the user forgets to open the supply flow path 40 can be suppressed.

(1-4) The operation portion 61 includes a lever 62A that can pivot between the open position where the supply flow path 40 is in the open state and the closed position where the supply flow path 40 is in the closed state. The opening/closing portion 63 includes the pressing member 66 which blocks the supply flow path 40 when the lever 62A is in the closed position and opens the supply flow path 40 when the lever 62A is in the open position. When the carriage 30 is moved in the closed state of the supply flow path 40, the lever 62A comes in contact with the contact portion 100. As a result, when the carriage 30 is moved in the closed state of the supply flow path 40, since the detection portion 84 can detect that the lever 62A positioned at the closed position is in contact with the contact portion 100, the possibility that the user forgets to open the supply flow path 40 can be suppressed.

(1-5) The operation portion 61 (lever 62A) is movable between the open position where the supply flow path 40 is in the open state and the closed position where the supply flow path 40 is in the closed state. In the contact portion 100, the operation portion 61 positioned at the open position is disposed outside the movement region TA (movement region TA of the lever 62A in the open position) moving with the movement of the carriage 30, and the operation portion 61 positioned at the closed position is disposed inside the movement region TB (movement region TB of the lever 62A in the closed position) moving with the movement of the carriage 30. Since the operation portion 61 positioned at the closed position is disposed inside the movement region TB moving with the movement of the carriage 30, the contact portion 100 comes in contact with the operation portion 61 when the carriage 30 moves in the X direction. Therefore, since the detection portion 84 can detect the contact between the operation portion 61 and the contact portion 100, the possibility that the user forgets to open the supply flow path 40 can be suppressed.

(1-6) The control portion 80 is further provided to control the movement of the carriage 30. The control portion 80 moves the carriage 30 in the X (+) direction (first direction) in the main scanning direction, and when detecting the closed state of the supply flow path 40, moves the carriage 30 in the X (−) direction (second direction) which is a direction opposite to the X (+) direction (first direction). As a result, the user can operate the operation portion 61. Therefore, the user can suppress the printing failure.

(1-7) The notification portion is further is provided to notify that the supply flow path 40 is in the closed state. As a result, since the user can know that the supply flow path 40 is in the closed state, the possibility that the user forgets to open the supply flow path 40 can be suppressed.

(1-8) In the detection method of the liquid ejecting apparatus 1A, it can be detected that the supply flow path 40 is in the closed state by the movement of the carriage 30. Therefore, the possibility that the user forgets to open the supply flow path 40 can be suppressed.

(1-9) In the detection method of the liquid ejecting apparatus 1A, it can be detected that the supply flow path 40 is in the closed state when the movement of the carriage 30 is inhibited in a case in which the carriage 30 is moved. Therefore, the possibility that the user forgets to open the supply flow path 40 can be suppressed.

(1-10) In the detection method of the liquid ejecting apparatus 1A, it can be detected that the supply flow path 40 is in the closed state by the driving load of the carriage motor 31. Therefore, the possibility that the user forgets to open the supply flow path 40 can be suppressed.

(1-11) In the detection method of the liquid ejecting apparatus 1A, the carriage 30 is moved with the power on, and the state of the supply flow path 40 is detected by the movement of the carriage 30. When closing the opening/closing mechanism 60A (supply flow path 40), since the power is not turned on when transporting the apparatus, the open/closed state of the supply flow path 40 may be detected when the power is turned on. With this configuration, since the number of detections can be reduced, the throughput can be improved.

Embodiment 2

Figure 9:
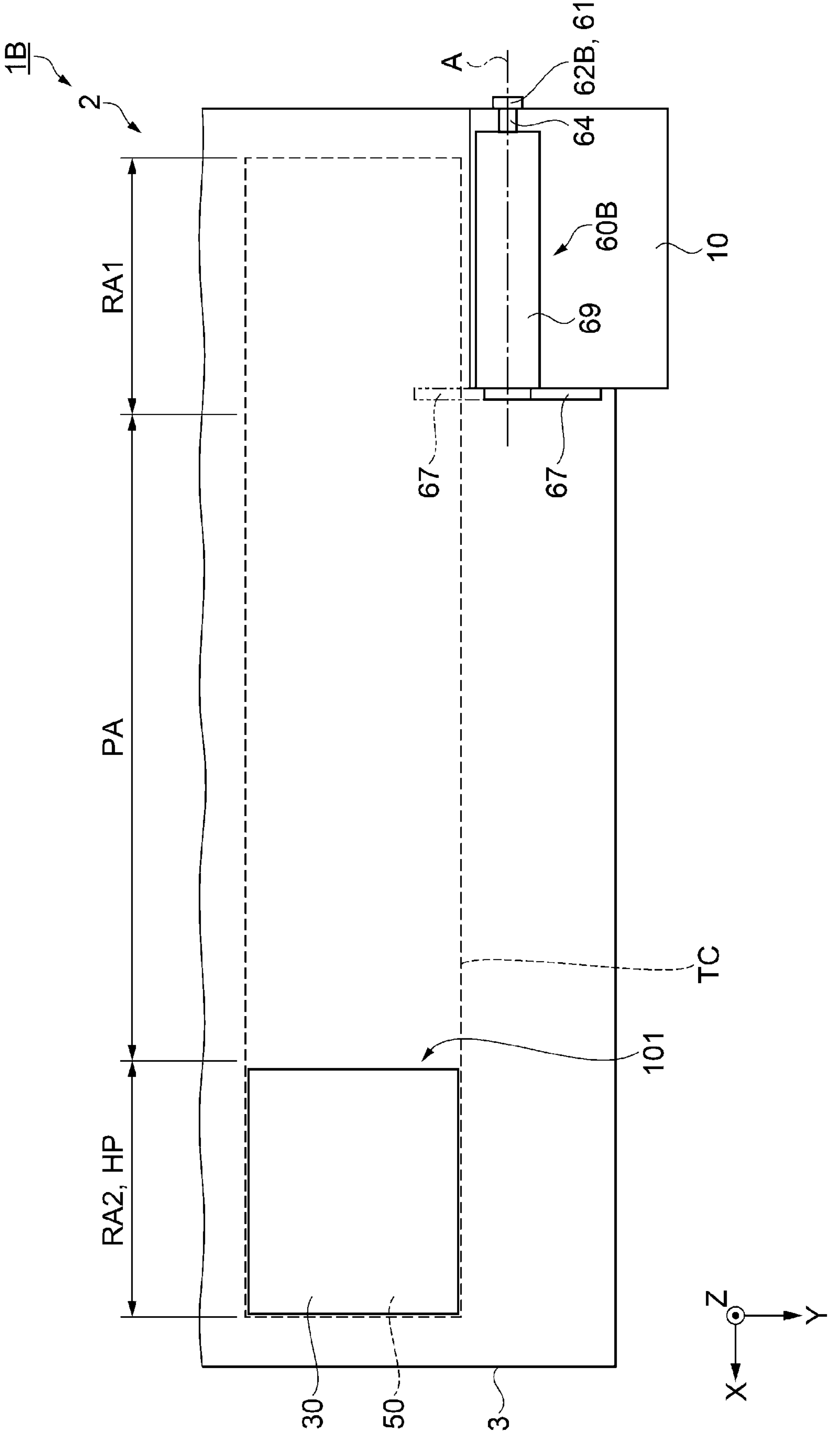
FIG. 9 is a schematic view of a liquid ejecting apparatus according to Embodiment 2 as viewed from a Z (+) direction side.
Figure 10:
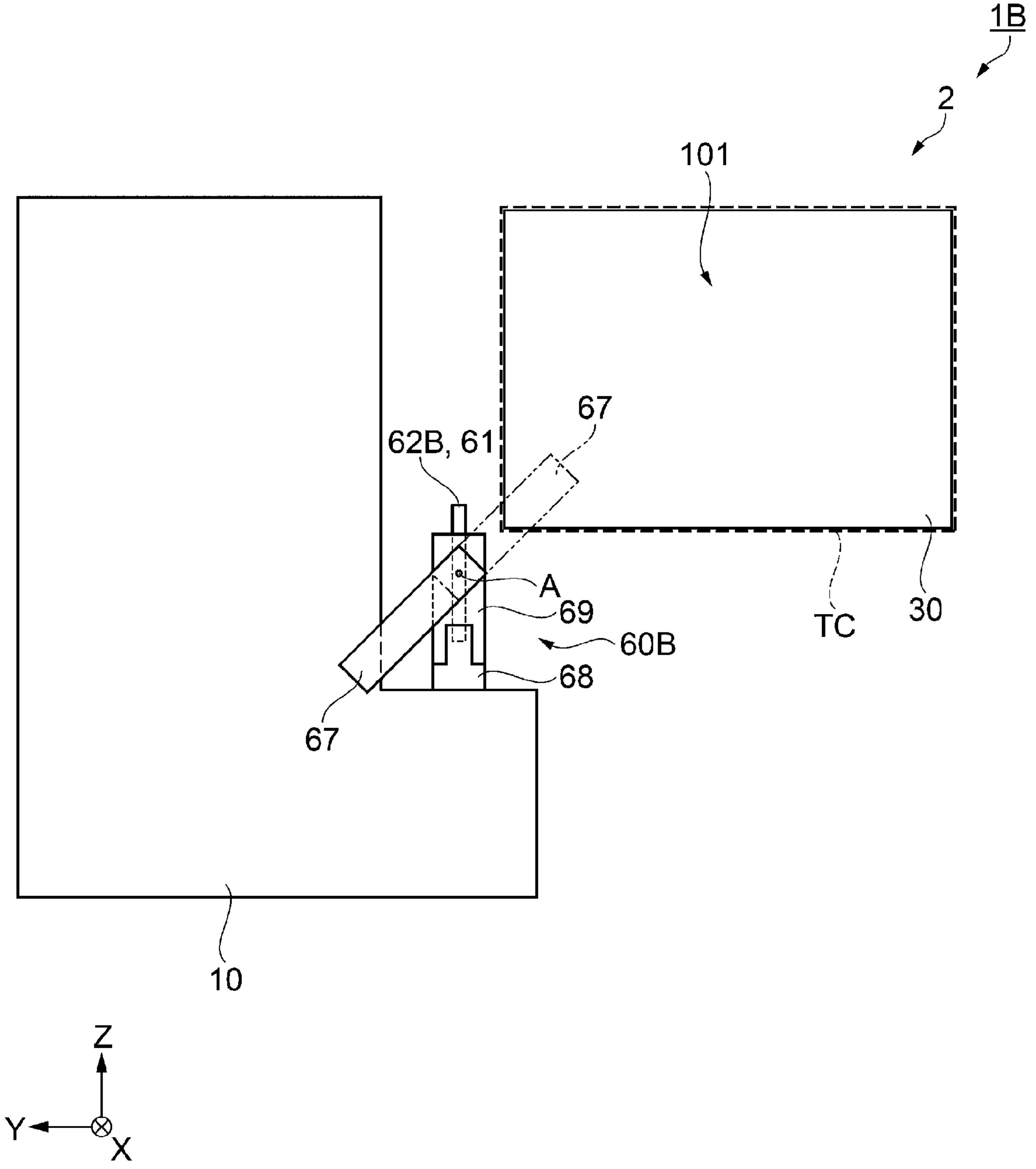
FIG. 10 is a schematic view of the liquid ejecting apparatus according to Embodiment 2 as viewed from an X (–) direction side.
Figure 11:
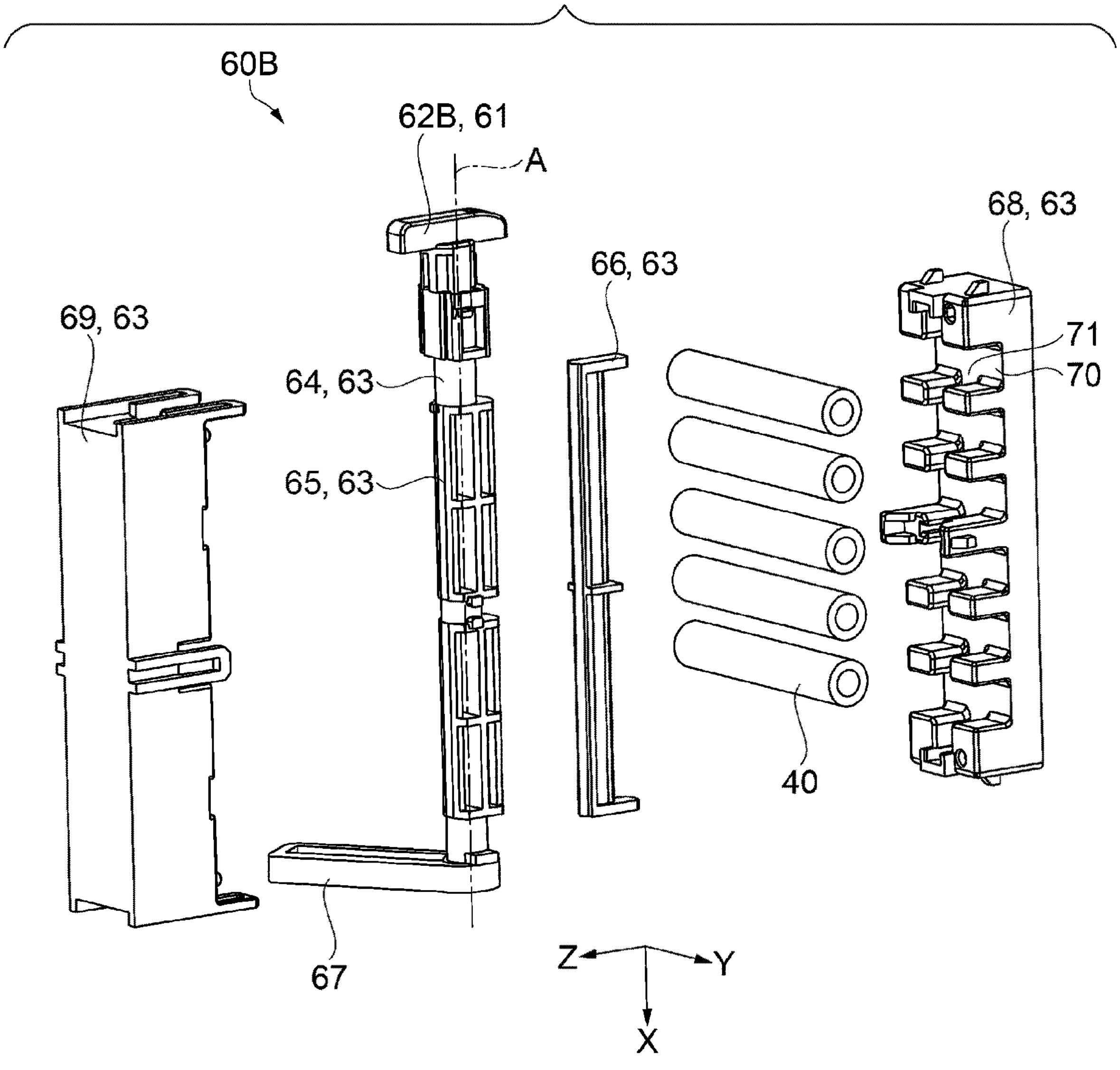
FIG. 11 is an exploded perspective view of an opening/closing mechanism according to Embodiment 2.

FIG. 9 is a view corresponding to FIG. 4 and is a schematic view of a liquid ejecting apparatus 1B according to Embodiment 2 as viewed from the Z (+) direction. FIG. 10 is a schematic view of the liquid ejecting apparatus 1B according to Embodiment 2 as viewed from the X (−) direction side. FIG. 11 is a view corresponding to FIG. 7 and is an exploded perspective view of an opening/closing mechanism 60B according to Embodiment 2. In FIG. 9, a region TC where the carriage 30 moves (hereinafter, referred to as movement region TC of the carriage 30) is illustrated by a dashed line. Furthermore, in FIG. 9, the illustration of the frame 4 is not repeated. In FIG. 10, the carriage 30, a lever 62B, and the liquid storage unit 10 are schematically illustrated, and the other components are not illustrated. Furthermore, in FIGS. 9 and 10, a displacement member 67 when the supply flow path 40 is in the open state is illustrated by a solid line, and the displacement member 67 when the supply flow path 40 is in the closed state is illustrated by a two-dot chain line.

In Embodiment 1 described above, the opening/closing mechanism 60A is mounted on the carriage 30, and moves together with the carriage 30. The contact portion 100 that comes in contact with the opening/closing mechanism 60A when the supply flow path 40 is in the closed state is provided on the frame 4 and is stationary. When the supply flow path 40 is in the closed state, the opening/closing mechanism 60A moves and comes in contact with the contact portion 100. In the present embodiment, a contact portion 101 is provided on the carriage 30 and moves. The opening/closing mechanism 60B that comes in contact with the contact portion 101 when the supply flow path 40 is in the closed state is stationary without moving. When the supply flow path 40 is in the closed state, the contact portion 101 moves and comes in contact with the opening/closing mechanism 60B. This point is a main difference between the present embodiment and Embodiment 1. Hereinafter, an outline of the liquid ejecting apparatus 1B according to the present embodiment will be described with reference to FIGS. 9 to 11, focusing on differences from Embodiment 1. In addition, the same components as in Embodiment 1 will be assigned the same reference numerals and redundant descriptions will not be repeated.

As illustrated in FIG. 9, the home position HP, which is a position at which the carriage 30 stands by at the time of non-printing, is disposed in the non-printing region RA2. On the other hand, in Embodiment 1, the home position HP, which is a position where the carriage 30 stands by at the time of non-printing, is disposed in the non-printing region RA1. The liquid storage unit 10 is disposed in the non-printing region RA1.

As illustrated in FIGS. 9 and 10, the liquid ejecting portion 50 is mounted on the carriage 30, and the opening/closing mechanism 60B is not mounted. On the other hand, in Embodiment 1, the liquid ejecting portion 50 and the opening/closing mechanism 60A are mounted on the carriage 30, and the opening/closing mechanism 60A moves together with the carriage 30. The opening/closing mechanism 60B is disposed at the upper portion of the liquid storage unit 10 so as to be in contact with a surface positioned on the Z (−) direction side of the surfaces (upper surfaces) on the Z (+) direction side of the two liquid storage units 10. Therefore, the opening/closing mechanism 60B is stationary without moving.

As illustrated in FIG. 11, the opening/closing mechanism 60B includes the opening/closing portion 63 for bringing the supply flow path 40 into the open state or the closed state, the operation portion 61 for operating the opening/closing portion 63, and the displacement member 67. The opening/closing portion 63 includes the supply flow path support portion 68, the shaft portion 64, the pressing member 66, the cam member 65, and the case 69. The operation portion 61 includes the lever 62B pivotable about the shaft portion 64 between the open position where the supply flow path 40 is in the open state and the closed position where the supply flow path 40 is in the closed state. The pressing member 66 closes the supply flow path 40 when the lever 62B is in the closed position, and opens the supply flow path 40 when the lever 62B is in the open position. The opening/closing mechanism 60B is disposed inside the housing 3 of the apparatus main body 2, except for the lever 62B. Therefore, the lever 62B protrudes from the side surface on the X (−) direction side of the housing 3 to the outside of the housing 3. The lever 62B may be provided in the housing 3. In such a case, for example, it is preferable to provide an opening (not illustrated) in the frame 4 of the housing 3 so that the lever 62B can be accessed when the scanner 5 is opened. The displacement member 67 is mounted on the end portion of the shaft portion 64 opposite to a side where the lever 62B is mounted, and is displaced in interlocked with the movement of the lever 62B. On the other hand, in Embodiment 1, the opening/closing mechanism 60A includes the opening/closing portion 63 and the operation portion 61, and does not include the displacement member 67. Furthermore, the lever 62B of the present embodiment is shorter in size than the lever 62A in Embodiment 1, the shaft portion 64 is disposed at a center of the lever 62B in the longitudinal direction, and the user is likely to grip and pivot the lever 62B. The lever 62B pivots about a pivot axis A along the X direction of the shaft portion 64. The lever 62B is attached to the end portion of the shaft portion 64 in the X (−) direction, and the displacement member 67 is attached to the end portion of the shaft portion 64 in the X (+) direction. As a result, the displacement member 67 can pivot in interlocked with the lever 62B that pivots about the pivot axis A via the shaft portion 64. As described above, the opening/closing mechanism 60B includes the displacement member 67 that is displaced in interlocked with the lever 62B. In the present embodiment, an angle formed by the longitudinal direction of the lever 62B and the longitudinal direction of the displacement member 67 is configured to be 45 degrees. The angle between the longitudinal direction of the lever 62B and the longitudinal direction of the displacement member 67 can be changed as appropriate.

When the user grips the lever 62B and turns the lever 62B in the direction where the supply flow path 40 is in the closed state, the pressing member 66 crushes the supply flow path 40 and the supply flow path 40 is in the closed state. When the user grips the lever 62B and turns the lever 62B in the direction where the supply flow path 40 is in the open state, the crushing of the supply flow path 40 by the pressing member 66 is released and the supply flow path 40 is in the open state.

The displacement member 67 displaces between an open position when the supply flow path 40 is in the open state and a closed position (position of displacement member 67 illustrated by solid line in FIG. 10) when the supply flow path 40 is in the closed state (position of displacement member 67 indicated by two-dot chain line in FIG. 10). In the following description, the displacement member 67 when the supply flow path is in the closed state is referred to as the displacement member 67 in the closed position, and the displacement member 67 when the supply flow path 40 is in the open state is referred to as the displacement member 67 in the open position. In FIG. 10, when the displacement member 67 in the open position illustrated by the solid line in the drawing is turned 180 degrees counterclockwise, the displacement member 67 becomes the displacement member 67 in the closed position illustrated by the two-dot chain line in the drawing. When the displacement member 67 in the closed position illustrated by the two-dot chain line in the drawing is turned 180 degrees clockwise, the displacement member 67 becomes the displacement member 67 in the open position illustrated by the solid line in the drawing. Furthermore, in FIG. 10, when the displacement member 67 is viewed from the X direction side, the displacement member 67 in the open position illustrated by the solid line in the drawing does not overlap the carriage 30, and the displacement member 67 in the closed position illustrated by the two-dot chain line in the drawing overlaps the carriage 30.

As illustrated in FIGS. 9 and 10, when the supply flow path 40 is in the closed state, the displacement member 67 in the closed position illustrated by the two-dot chain line in the drawing is disposed inside the movement region TC of the carriage 30, when the carriage 30 positioned at the position HP is moved in the X (−) direction, the surface (contact portion 101) on the X (−) direction side of the carriage 30 comes in contact with the displacement member 67 in the closed position, and the movement of the carriage 30 is inhibited. That is, when the carriage 30 positioned at the home position HP is moved in the X (−) direction, the surface on the X (−) side of the carriage 30 contacting the displacement member 67 in the closed position is the contact portion 101. As described above, in the present embodiment, the contact portion 101 is provided on the carriage 30. The displacement member 67 comes in contact with the contact portion 101 provided on the carriage 30 when the carriage 30 is moved in the closed state of the supply flow path 40. In other words, the carriage 30 mounts the liquid ejecting portion 50, can reciprocate in the X direction, and includes the contact portion 101 capable of contacting the displacement member 67 (opening/closing mechanism 60B) when the supply flow path 40 is in the closed state. The contact portion 101 may be provided on the carriage 30 as in the present embodiment, or may be fixed to the housing of the carriage 30 and provided as a member separate from the carriage 30 such as a buffer material that can buffer the contact with the displacement member 67.

On the other hand, when the supply flow path 40 is in the open state, the displacement member 67 in the open position illustrated by the solid line in the drawing is disposed outside the movement region TC of the carriage 30, when the carriage 30 positioned at the position HP is moved in the X (−) direction, the surface (contact portion 101) on the X (−) direction side of the carriage 30 does not come in contact with the displacement member 67 in the open position, and the movement of the carriage 30 is not inhibited.

Detection Method of Open/Closed State of Supply Flow Path

Next, a detection method of the open/closed state of the supply flow path 40 will be described. As described above, the control portion 80 detects the open/closed state of the supply flow path 40 at a specific timing. In addition, since the lever 62B of the present embodiment is provided outside the housing 3, it is not necessary to detect the open/closed state of the supply flow path 40 after the opening/closing operation of the scanner 5. When the lever 62B is provided inside the housing 3, it is preferable to detect the open/closed state of the supply flow path 40 after the opening/closing operation of the scanner 5.

First, the control portion 80 moves the carriage 30 positioned at the home position HP in the X (−) direction (first direction). When the supply flow path 40 is in the open state, since the displacement member 67 positioned at the open position is positioned outside the movement region TC of the carriage 30, even in a case in which the carriage is moved in the X (−) direction (first direction), the contact portion 101 and the displacement member 67 do not contact each other. In this case, the driving load of the carriage motor 31 does not exceed the threshold value, and the detection portion 84 does not detect the contact between the contact portion 101 and the displacement member 67. The control portion 80 determines that the supply flow path 40 is in the open state.

When the supply flow path 40 is in the closed state, the displacement member 67 positioned at the closed position is positioned inside the movement region TC of the carriage 30. Therefore, when the carriage 30 positioned at the home position HP is moved in the X (−) direction (first direction), the contact portion 101 and the displacement member 67 contact each other, the movement of the carriage 30 is inhibited, and the driving load of the carriage motor 31 increases. The detection portion 84 detects the contact between the contact portion 101 and the displacement member 67 when the driving load of the carriage motor 31 exceeds the threshold value. The control portion 80 determines that the supply flow path 40 is in the closed state. As described above, the detection method of the liquid ejecting apparatus 1B according to the present embodiment detects that the supply flow path 40 is in the closed state by the movement of the carriage 30. In other words, when the carriage 30 is moved, the detection method of the liquid ejecting apparatus 1B according to the present embodiment detects that the supply flow path 40 is in the closed state in a case in which the movement of the carriage 30 is inhibited. Furthermore, in other words, in the detection method of the liquid ejecting apparatus 1B according to the present embodiment, the liquid ejecting apparatus 1B is provided with the carriage motor 31 for moving the carriage 30, and it is detected that the supply flow path 40 is in the closed state by the driving load of the carriage motor 31. Furthermore, when the control portion 80 moves the carriage 30 in the X (−) direction (first direction) in the X direction (main scanning direction) and detects the closed state of the supply flow path 40, the control portion 80 moves the carriage 30 in the X (+) direction (second direction) opposite to the X (−) direction (first direction), and moves the carriage 30 to the home position HP. As described above, in the present embodiment, the X (−) direction corresponds to the "first direction in the main scanning direction", and the X (+) direction corresponds to the "second direction opposite to the first direction".

In addition, in the present embodiment, the open/closed state of the supply flow path 40 is detected using the opening/closing mechanism 60B, the housing 3 (frame 4), the carriage 30, the control portion 80 (detection portion 84), and the operation panel 6 among the components of the liquid ejecting apparatus 1B. The components (opening/closing mechanism 60B, housing 3, carriage 30, control portion 80, and operation panel 6) for detecting the open/ closed state of the supply flow path 40 are components for the liquid ejecting apparatus 1B to print on the medium. In the present embodiment, since the liquid ejecting apparatus 1B detects the open/closed state of the supply flow path 40 by using the components for printing on the medium, it is possible to reduce the cost of the liquid ejecting apparatus 1B without requiring a new component to detect the open/closed state of the supply flow path 40, compared to the case where a new component is required to detect the open/closed state of the supply flow path 40.

Hereinafter, the effects of the present embodiment will be described. (2-1) In order to open and close the supply flow path 40 by operating the operation portion 61 manually, when the liquid ejecting apparatus 1B is transported and printing is resumed in a state where the liquid ejecting apparatus 1B is filled with ink, it may forget to open the supply flow path 40. In that respect, when the carriage 30 is moved in the closed state of the supply flow path 40, the detection portion 84 can detect that the opening/closing mechanism 60B is in contact with the contact portion 101. As a result, the possibility that the user forgets to open the supply flow path 40 can be suppressed.

(2-2) The opening/closing mechanism 60B includes the displacement member 67 displaced in interlocked with the operation portion 61, and the displacement member 67 comes in contact with the contact portion 101 when the carriage 30 is moved in the closed state of the supply flow path 40. As a result, when the carriage 30 is moved in the closed state of the supply flow path 40, since the detection portion 84 can detect that the displacement member 67 is in contact with the contact portion 101, the possibility that the user forgets to open the supply flow path 40 can be suppressed.

(2-3) The operation portion 61 includes a lever 62B that can pivot about the shaft portion 64 between the open position where the supply flow path 40 is in the open state and the closed position where the supply flow path 40 is in the closed state. The opening/closing portion 63 includes the pressing member 66 which blocks the supply flow path 40 when the lever 62B is in the closed position and opens the supply flow path 40 when the lever 62B is in the open position, and the shaft portion 64. The displacement member 67 is displaced in interlocked with the movement of the lever 62B via the shaft portion 64. As a result, when the carriage 30 is moved in the closed state of the supply flow path 40, since the detection portion 84 can detect that the displacement member 67 is in contact with the contact portion 101, the possibility that the user forgets to open the supply flow path 40 can be suppressed.

(2-4) When the supply flow path 40 is in the closed state, the displacement member 67 is positioned at the movement region TC of the carriage 30. As a result, when the carriage 30 is moved in a case in which the supply flow path 40 is in the closed state, the displacement member 67 comes in contact with the contact portion 101. Therefore, since the detection portion 84 can detect the contact between the contact portion 101 and the displacement member 67, the possibility that the user forgets to open the supply flow path 40 can be suppressed.

The present disclosure is not limited to the above embodiment, can be modified as appropriate without departing from the scope and spirit of the disclosure which can be read from the aspects and the specification as a whole, and various modifications can be considered other than the above embodiment. Hereinafter, modifications are given and described.

Modification 1

The liquid ejecting apparatus 1A of Embodiment 1 may be configured to mount the opening/closing mechanism 60B of Embodiment 2 instead of the opening/closing mechanism 60A. That is, the displacement member 67 in the closed position may be in contact with the contact portion 100.

The contact portion 100 in Modification 1 is positioned outside the movement region where the displacement member 67 in the open position moves in the X direction with the movement of the carriage 30. That is, the contact portion 100 in Modification 1 is positioned outside the movement region of the displacement member 67 in the open position. Therefore, when the supply flow path 40 is in the open state, even in a case in which the carriage 30 moves in the first direction (X (+) direction), the displacement member 67 in the open position and the contact portion 100 do not contact each other.

In addition, the contact portion 100 is positioned inside the movement region where the displacement member 67 in the closed position moves in the X direction with the movement of the carriage 30. That is, the contact portion 100 in Modification 1 is positioned inside the movement region of the displacement member 67 in the closed position. Therefore, when the supply flow path 40 is in the closed state, in a case in which the carriage 30 moves in the first direction (X (+) direction), the displacement member 67 in the closed position comes in contact with the contact portion 100, and the movement of the carriage 30 is inhibited.

With such a configuration, when the carriage 30 is moved in the closed state of the supply flow path 40, since the detection portion 84 can detect that the displacement member 67 comes in contact with the contact portion 100, the possibility that the user forgets to open the supply flow path 40 can be suppressed.

Modification 2

The liquid ejecting apparatus 1B of Embodiment 2 may be configured to have the opening/closing mechanism 60A of Embodiment 1 instead of the opening/closing mechanism 60B. That is, the contact portion 101 and the lever 62A may be in contact with each other. In Modification 2, the lever 62A in the closed position is disposed inside the movement region TC of the carriage 30, and the lever 62A in the open position is disposed outside the movement region TC of the carriage 30.

Therefore, when the supply flow path 40 is in the open state, even in a case in which the carriage 30 moves in the first direction (X (−) direction), the lever 62A in the open position does not come in contact with the contact portion 101. Furthermore, when the supply flow path 40 is in the closed state, in a case in which the carriage 30 moves in the first direction (X (−) direction), the lever 62A in the closed position comes in contact with the contact portion 101, and the movement of the carriage 30 is inhibited.

With such a configuration, when the carriage 30 is moved in the closed state of the supply flow path 40, since the detection portion 84 can detect that the operation portion 61 is in contact with the contact portion 101, the possibility that the user forgets to open the supply flow path 40 can be suppressed.

Modification 3

The cam member 65, the shaft portion 64, and the pressing member 66 may be integrally formed. In this manner, the number of parts can be reduced. In addition, the shaft portion 64 and the lever 62A may be integrally formed. Furthermore, the shaft portion 64, the lever 62B, and the displacement member 67 may be integrally formed.

Modification 4

In Embodiment 1 described above, the control portion 80 may set in advance a deceleration position at which the movement of the carriage 30 in the first direction is decelerated between a stop position which is the position of the carriage 30 when the movement of the carriage 30 is stopped by the contact between the lever 62A in the closed position and the contact portion 100, and the home position HP in the main scanning direction. That is, when the open/closed state of the supply flow path 40 is detected, in a case in which the carriage 30 moves to the deceleration position, the movement speed of the carriage 30 is decelerated. Therefore, since the movement speed of the carriage 30 can be increased up to the deceleration position, the throughput can be improved.

Modification 5

In Embodiment 2 described above, the control portion 80 may set in advance a deceleration position at which the movement of the carriage 30 in the first direction is decelerated between the stop position which is the position of the carriage 30 when the movement of the carriage 30 is stopped by the contact between the displacement member 67 positioned at the closed position and the contact portion 101, and the home position HP in the main scanning direction. That is, when the open/closed state of the supply flow path 40 is detected, in a case in which the carriage 30 moves to the deceleration position, the movement speed of the carriage 30 is decelerated. Therefore, since the movement speed of the carriage 30 can be increased up to the deceleration position, the throughput can be improved.

Modification 6

In each of the embodiments described above, the detection portion 84 detects that the driving load of the carriage motor 31 exceeds the threshold value by inhibiting the movement of the carriage 30 in the first direction. The control portion 80 determines that the supply flow path 40 is in the closed state, based on the detection result of the detection portion 84. The fact that the movement of the carriage 30 in the first direction is inhibited includes not only when the movement of the carriage 30 stops but also when the speed at which the carriage 30 moves in the first direction is slow. That is, the fact that the movement of the carriage 30 in the first direction is inhibited due to the contact between the contact portion 100 and the operation portion 61 or the contact between the contact portion 101 and the displacement member 67 includes the movement speed of the carriage 30 being slow, in addition to the movement of the carriage 30 being stopped.

Even in such a case, while the movement of the carriage 30 in the first direction is inhibited, the driving load of the carriage motor 31 is increased. The change in the driving load of the carriage motor 31 when the movement speed of the carriage 30 is slow is smaller than the change in the driving load of the carriage motor 31 when the movement of the carriage 30 is stopped. Therefore, by setting the threshold value of the driving load of the carriage motor 31 when the movement speed of the carriage 30 is slow lower than the threshold value of the driving load of the carriage motor 31 when the carriage 30 stops, even in a case in which the movement speed of the carriage 30 is slow, in addition to the case where the movement of the carriage 30 stops, the contact between the contact portion 100 and the operation portion 61 or the contact between the contact portion 101 and the displacement member 67 may be detected.

Modification 7

The operation portion 61 may adopt a slide type operation portion 61, instead of the levers 62A and 62B which pivot about the shaft portion 64. In addition, the displacement member 67 may be displaced by turning a grip as the operation portion 61.

Modification 8

As a configuration for blocking the supply flow path 40 other than crushing the supply flow path 40 by the pressing member 66, a configuration may be adopted in which a flexible diaphragm may be pressurized with air to block the supply flow path 40, by operating the operation portion 61.

Modification 9

Each of the embodiments described above is not limited to the configuration in which the open/closed state of the supply flow path 40 is detected by detecting the driving load of the carriage motor 31. By providing an optical sensor for detecting the operation portion 61 positioned at the closed position or the displacement member 67 at a position where the movement of the carriage 30 in the first direction is stopped when the supply flow path 40 is in the closed state, the contact between the operation portion 61 and the contact portion 100 or the contact between the displacement member 67 and the contact portion 101 may be configured to be detected.

Modification 10

In Embodiment 1 described above, the contact portion 100 may be configured to form the apparatus main body 2 other than the frame 4 of the housing 3. For example, the contact portion 100 may be provided on a housing of a maintenance box (not illustrated) which is provided in the apparatus main body 2 and recovers the waste liquid discharged for the maintenance of the liquid ejecting portion 50.

Modification 11

The direction in which the plurality of supply flow paths 40 are disposed by the supply flow path support portion 68 may be changed as appropriate.

Modification 12

In Embodiment 2 described above, although the opening/closing mechanism 60B is disposed on the liquid storage unit 10 the opening/closing mechanism 60B may be disposed at any position inside the apparatus main body 2.

Modification 13

Although each of the embodiments described above adopts five types of ink, any number of types of ink may be adopted. In such a case, the numbers of the liquid storage portions 13, the supply flow paths 40, and the like may be made to correspond to the number of any types of ink to be adopted.

Modification 14

The liquid ejecting apparatuses 1A and 1B may be liquid ejecting apparatuses 1A and 1B which eject a liquid other than ink. The states of the liquids discharged from the liquid ejecting apparatuses 1A and 1B as a small amount of droplets, include granular, tear-like, and thread-like tailed states. The liquid referred to here may be any material that can be ejected from the liquid ejecting apparatuses 1A and 1B. For example, the liquid may be a liquid in a state when the substance is in the liquid phase, and includes a fluid such as a liquid having high or low viscosity, a sol, gel water, other inorganic solvents, an organic solvent, a solution, a liquid resin, a liquid metal, and a metallic melt. The liquid includes not only the liquid as one state of substance but also particles of functional material formed of solid matter such as pigment and metal particles dissolved, dispersed or mixed in a solvent. Representative examples of the liquid include the ink described in the above embodiments, liquid crystal, and the like. Here, the ink includes general aqueous inks and oil-based inks, and various liquid compositions such as gel inks and hot melt inks. Specific examples of the liquid ejecting apparatuses 1A and 1B include an apparatus which ejects a liquid containing a material such as an electrode material and a coloring material used for manufacturing a liquid crystal display, an electroluminescence display, a surface emitting display, a color filter, and the like in the form of dispersion or dissolution. The liquid ejecting apparatuses 1A and 1B may be an apparatus for ejecting a bioorganic substance used for manufacturing a biochip, an apparatus for ejecting a liquid serving as a sample and used as a precision pipette, a printing apparatus, a micro dispenser, and the like. The liquid ejecting apparatuses 1A and 1B may be an apparatus for ejecting lubricating oil at a pinpoint on a precision machine such as a watch and a camera, and an apparatus for ejecting a transparent resin liquid such as UV curable resin on a substrate to form a micro hemispherical lens, an optical lens, and the like used for an optical communication element. The liquid ejecting apparatuses 1A and 1B may be an apparatus for ejecting an etching solution such as an acid or an alkali to etch a substrate or the like.

Hereinafter, the contents derived from the embodiment will be described.

The liquid ejecting apparatus according to the present application includes the liquid ejecting portion having the nozzle ejecting the liquid onto the medium, the liquid storage portion that stores the liquid, the supply flow path through which the liquid storage portion communicates with the liquid ejecting portion, the opening/closing mechanism having the opening/closing portion bringing the supply flow path into an open state or a closed state, and the operation portion operating the opening/closing portion, the carriage mounted with the liquid ejecting portion and the opening/closing mechanism and configured to reciprocate in the main scanning direction, the contact portion that comes in contact with the opening/closing mechanism when the carriage moves while the supply flow path is in the closed state, and the detection portion that detects contact between the opening/closing mechanism and the contact portion.

According to this configuration, when the carriage is moved in the closed state of the supply flow path, the contact portion that comes in contact with the opening/closing mechanism is provided. Therefore, the detection portion can detect the open/closed state of the supply flow path due to the presence or absence of the contact between the opening/closing mechanism and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the contact portion is provided in the housing storing the liquid ejecting portion and the carriage.

According to this configuration, since the housing has high rigidity, when the contact portion is provided on the housing, the contact portion is unlikely to be deformed, and the detection portion can stably detect the contact between the opening/closing mechanism and the contact portion.

In the liquid ejecting apparatus described above, it is preferable that the operation portion comes in contact with the contact portion when the carriage moves while the supply flow path is in the closed state.

When the contact portion comes in contact with the operation portion in a case in which the carriage is moved in the closed state of the supply flow path, the detection portion detects the open/closed state of the supply flow path due to the presence or absence of the contact between the operation portion and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the operation portion includes the lever configured to pivot between the open position where the supply flow path is in the open state and the closed position where the supply flow path is in the closed state, the opening/closing portion includes the pressing member that blocks the supply flow path when the lever is in the closed position, and opens the supply flow path when the lever is in the open position, and the lever comes in contact with the contact portion when the carriage moves while the supply flow path is in the closed state.

When the carriage is moved in the closed state of the supply flow path, the lever positioned at the closed position comes into contact with the contact portion. Therefore, the detection portion can detect the open and closed state of the supply flow path due to the presence or absence of the contact between the lever and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the operation portion is configured to move between the open position where the supply flow path is in the open state and the closed position where the supply flow path is in the closed state, and the contact portion, is disposed outside the movement region in which the operation portion positioned at the open position moves with the movement of the carriage, and is disposed inside the movement region in which the operation portion positioned at the closed position moves with the movement of the carriage.

When the contact portion is disposed outside the movement region in which the operation portion positioned at the open position moves with the movement of the carriage, and is disposed inside the movement region in which the operation portion positioned at the closed position moves with the movement of the carriage, the contact portion does not come in contact with the operation portion positioned at the open position, and comes in contact with the operation portion positioned at the closed position. As a result, the detection portion can detect the open/closed state of the supply flow path due to the presence or absence of the contact between the operation portion and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the opening/closing mechanism includes the displacement member that is displaced in interlocked with the operation portion, and the displacement member comes in contact with the contact portion when the carriage moves while the supply flow path is in the closed state.

When the carriage is moved in the closed state of the supply flow path, the displacement member comes in contact with the contact portion. As a result, the detection portion can detect the open/closed state of the supply flow path due to the presence or absence of the contact between the displacement member and the contact portion. Furthermore, when the supply flow path is opened in a case in which the supply flow path is closed, the problem that printing is resumed in the closed state of the supply flow path is suppressed.

The liquid ejecting apparatus according to the present application includes the liquid ejecting portion having the nozzle ejecting the liquid onto the medium, the liquid storage portion that stores the liquid, the supply flow path through which the liquid storage portion communicates with the liquid ejecting portion, the opening/closing mechanism having the opening/closing portion bringing the supply flow path into an open state or a closed state, and the operation portion operating the opening/closing portion, the carriage mounted with the liquid ejecting portion, configured to reciprocate in the main scanning direction, and having the contact portion contacting the opening/closing mechanism when the supply flow path is in the closed state, and the detection portion that detects contact between the opening/closing mechanism and the contact portion.

Since the carriage includes the contact portion that can come in contact with the opening/closing mechanism when the supply flow path is in the closed state, the detection portion can detect the open/closed state of the supply flow path due to the presence or absence of the contact between the opening/closing mechanism and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the contact portion comes in contact with the operation portion when the carriage moves while the supply flow path is in the closed state.

According to this configuration, when the carriage is moved in the closed state of the supply flow path, the operation portion of the opening/closing mechanism comes in contact with the contact portion. Therefore, the detection portion can detect the open/closed state of the supply flow path due to the presence or absence of the contact between the operation portion of the opening/closing mechanism and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the opening/closing mechanism includes the displacement member that is displaced in interlocked with the operation portion, and the contact portion comes in contact with the displacement member when the carriage moves while the supply flow path is in the closed state.

According to this configuration, when the carriage is moved in the closed state of the supply flow path, the displacement member comes in contact with the contact portion. Therefore, the detection portion can detect the open/closed state of the supply flow path depending on the presence or absence of contact between the displacement member and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the operation portion includes the lever configured to pivot about the shaft portion between the open position where the supply flow path is in the open state and the closed position where the supply flow path is in the closed state, the opening/closing portion includes the pressing member that blocks the supply flow path when the lever is in the closed position and opens the supply flow path when the lever is in the open position, and the shaft portion, and the displacement member is displaced in interlocked with the movement of the lever via the shaft portion.

According to this configuration, when the displacement member that displaces in interlocked with the movement of the lever is provided, the displacement member and the contact portion can be brought into contact with each other in a case in which the carriage is moved in the closed state of the supply flow path, and the displacement member and the contact portion can be brought into non-contact with each other in a case in which the carriage is moved in the open state of the supply flow path. As a result, the detection portion can detect the open/closed state of the supply flow path due to the presence or absence of the contact between the displacement member and the contact portion. Furthermore, when the supply flow path is opened in a case in which the supply flow path is closed, the problem that printing is resumed in the closed state of the supply flow path is suppressed.

In the liquid ejecting apparatus described above, it is preferable that the displacement member is positioned in the movement region of the carriage when the supply flow path is in the closed state.

When the supply flow path is in the closed state, in a case in which the displacement member is positioned in the movement region of the carriage, the displacement member and the contact portion come into contact with each other when the carriage is moved in the closed state of the supply flow path. As a result, the detection portion can detect the open/closed state of the supply flow path due to the presence or absence of the contact between the displacement member and the contact portion. Furthermore, when the supply flow path is opened in a case in which the supply flow path is closed, the problem that printing is resumed in the closed state of the supply flow path is suppressed.

It is preferable that the liquid ejecting apparatus described above further includes the control portion that controls the movement of the carriage, and the control portion moves the carriage in the first direction in the main scanning direction, and moves the carriage in the second direction opposite to the first direction when the closed state of the supply flow path is detected.

When the carriage is moved in the first direction in the main scanning direction and the closed state of the supply flow path is detected, in a case in which the carriage is moved in the second direction opposite to the first direction, a work space changing the supply flow path from the closed state to the open state can be provided on the second direction side, and the operation of changing the supply flow path from the closed state to the open state can be properly performed.

It is preferable that the liquid ejecting apparatus described above further includes the notification portion which notifies that the supply flow path is in the closed state.

When the notification portion that notifies that the supply flow path is in the closed state is provided, the user is likely to reliably grasp that the supply flow path is in the closed state.

The detection method of the liquid ejecting apparatus according to the present application including the liquid ejecting portion having the nozzle ejecting the liquid onto the medium, the liquid storage portion storing the liquid, the supply flow path through which the liquid storage portion communicates with the liquid ejecting portion, the opening/closing mechanism bringing the supply flow path into an open state or a closed state, and the carriage mounted with the liquid ejecting portion and configured to reciprocate in the main scanning direction, the method includes detecting that the supply flow path is in the closed state by the movement of the carriage.

According to this configuration, it is possible to detect that the supply flow path is in the closed state by the movement of the carriage. Therefore, when the supply flow path is opened in a case in which the supply flow path is closed, the problem that printing is resumed in the closed state of the supply flow path is suppressed.

In the detection method of the liquid ejecting apparatus described above, it is preferable that it is detected that the supply flow path is in the closed state when the movement of the carriage is inhibited.

According to this configuration, when the movement of the carriage is inhibited, it is detected that the supply flow path is in the closed state, and when the supply flow path is opened in a case in which the supply flow path is closed, the problem that printing is resumed in the closed state of the supply flow path is suppressed.

In the detection method of the liquid ejecting apparatus described above, it is preferable that the liquid ejecting apparatus further includes the carriage motor moving the carriage and it is detected that the supply flow path is in the closed state by the driving load of the carriage motor.

According to this configuration, it is possible to detect the open/closed state of the supply flow path by detecting the driving load of the carriage motor. Therefore, when the supply flow path is opened in a case in which the supply flow path is closed, the problem that printing is resumed in the closed state of the supply flow path is suppressed.

In the detection method of the liquid ejecting apparatus described above, it is preferable that the carriage is moved with power on, and the state of the supply flow path is detected by the movement of the carriage.

When the carriage is moved with power on, the open/closed state of the supply flow path is detected, and the supply flow path is opened in a case in which the supply flow path is closed, the problem that printing is resumed in the closed state of the supply flow path is suppressed.

What is claimed is:

1. A liquid ejecting apparatus comprising:

a liquid storage portion that stores liquid supplied to a liquid ejecting portion configured to eject the liquid;

a supply flow path that communicates the liquid storage portion and the liquid ejecting portion;

an opening/closing mechanism, the opening/closing mechanism including an opening/closing portion configured to switch between an open state that opens the supply flow path, and a closed state that closes the liquid supply flow path, and a manual operating portion configured to operate the opening/closing portion; a cover configured to cover the manual operating portion; and a transport portion configured to transport a medium in a transport direction;

a carriage configured to move in a main scanning direction intersecting the transport direction with the liquid ejection portion mounted to the carriage, wherein the manual operating portion is configured to be operated from above the liquid ejecting apparatus with the cover opened, the cover is configured to cover the manual operating portion in a state where the opening/closing portion is switched to the closed state, the opening/closing portion does not move with a movement of the carriage the opening/closing portion includes a pressing member which displaces in conjunction with the manual operating portion, and in the closed state, the pressing member crushes an elastic portion of the supply flow path.

2. The liquid ejecting apparatus according to claim 1, wherein the cover is disposed above an apparatus main body that accommodates the liquid ejecting portion, the opening/closing mechanism and the liquid storage portion inside, the inside of the apparatus main body is covered by the cover when the cover is closed with respect to the apparatus main body and is exposed when the cover is opened with respect to the apparatus main body.

3. The liquid ejecting apparatus according to claim 1, wherein the liquid storage portion has a pour port for pouring the liquid.

4. The liquid ejecting apparatus according to claim 1, wherein at least a part of the opening/closing mechanism is located at a position overlapping a moving region of the carriage in a plan view from above.

5. The liquid ejecting apparatus according to claim 1, wherein the manual operating portion that does not overlap with a standby position where the liquid ejecting portion stands by when not ejecting, as viewed from the transport direction.

6. The liquid ejecting apparatus according to claim 3, wherein the pour port is disposed downstream of the manual operating portion in the transport direction.

7. The liquid ejecting apparatus according to claim 1, further comprising:

a liquid storage unit including the liquid storage portion and a second cover that covers at least a part of an upper portion of the liquid storage portion, wherein the opening/closing portion is within a height of the liquid storage unit in a vertical direction.

8. The liquid ejecting apparatus according to claim 1, further comprising:

a liquid storage unit including the liquid storage portion and a second cover that covers at least a part of an upper portion of the liquid storage portion, wherein the manual operating portion is within a height of the liquid storage unit in a vertical direction.

9. The liquid ejecting apparatus according to claim 1, wherein the manual operating portion is disposed downstream of the liquid ejecting portion in the transport direction.

10. The liquid ejecting apparatus according to claim 1, further comprising:

a second liquid storage portion that stores liquid supplied to the liquid ejecting portion;

a second supply flow path that communicates the second liquid storage portion and the liquid ejecting portion; and a housing that houses the opening/closing portion, the supply flow path, and the second supply flow path, wherein the opening/closing portion closes the supply flow path and the second supply flow path when the operating portion is operated.

11. The liquid ejecting apparatus according to claim 1, wherein the opening/closing mechanism has a displacement portion which displaces in conjunction with the manual operating portion, and at least a part of the displacement portion overlaps at least a part of a liquid storage unit when the opening/closing portion is in the open state.

12. The liquid ejecting apparatus according to claim 11, further comprising:

a contact portion that comes in contact with a displacement member, wherein the displacement portion comes into contact with the contact portion when the displacement portion is displaced in a direction away from the liquid storage portion.

13. The liquid ejecting apparatus according to claim 1, wherein the manual operating portion pivots about a pivot axis intersecting with the supply flow path as a pivot center.

14. The liquid ejecting apparatus according to claim 1, wherein at least a part of the manual operating portion is disposed downstream of the opening/closing portion in the transport direction when the opening/closing portion is the closed state.

15. The liquid ejecting apparatus according to claim 1, further comprising:

a notification portion for notifying when the opening/closing portion is in the closed state.

* * * * *